United States Patent
Langhammer et al.

(10) Patent No.: US 12,554,464 B2
(45) Date of Patent: Feb. 17, 2026

(54) SYSTEMS AND METHODS FOR STRUCTURED MIXED-PRECISION IN A SPECIALIZED PROCESSING BLOCK

(71) Applicants: Martin Langhammer, Alderbury (GB); Michael Wu, Belmont, CA (US); Nihat Engin Tunali, San Jose, CA (US)

(72) Inventors: Martin Langhammer, Alderbury (GB); Michael Wu, Belmont, CA (US); Nihat Engin Tunali, San Jose, CA (US)

(73) Assignee: Altera Corporation, San Jose, CA (US)

( * ) Notice: Subject to any disclaimer, the term of this patent is extended or adjusted under 35 U.S.C. 154(b) by 857 days.

(21) Appl. No.: 17/559,338

(22) Filed: Dec. 22, 2021

(65) Prior Publication Data
US 2022/0113940 A1    Apr. 14, 2022

(51) Int. Cl.
G06F 7/523 (2006.01)
G06F 7/50 (2006.01)

(52) U.S. Cl.
CPC ............... *G06F 7/523* (2013.01); *G06F 7/50* (2013.01)

(58) Field of Classification Search
None
See application file for complete search history.

(56) References Cited

U.S. PATENT DOCUMENTS

| | | | |
|---|---|---|---|
| 5,522,085 | A | 5/1996 | Harrison et al. |
| 5,935,197 | A | 8/1999 | Aldworth |
| 6,631,461 | B2 | 10/2003 | Ganapathy et al. |
| 7,437,401 | B2 | 10/2008 | Zheng et al. |
| 8,521,800 | B1 | 8/2013 | Bergland et al. |
| 10,489,116 | B1 | 11/2019 | Esposito |
| 2017/0357891 | A1 | 12/2017 | Judd et al. |

(Continued)

FOREIGN PATENT DOCUMENTS

| | | |
|---|---|---|
| EP | 3330861 A1 | 6/2018 |
| WO | 2018213628 | 11/2018 |

OTHER PUBLICATIONS

X. Zhou, L. Zhang, C. Guo, X. Yin and C. Zhuo, "A Convolutional Neural Network Accelerator Architecture with Fine-Granular Mixed Precision Configurability," 2020 IEEE International Symposium on Circuits and Systems (ISCAS), Seville, Spain, 2020. (Year: 2020).

(Continued)

*Primary Examiner* — Andrew Caldwell
*Assistant Examiner* — Jonathan David Warner
(74) *Attorney, Agent, or Firm* — Fletcher Yoder, P.C.

(57) ABSTRACT

This disclosure is directed to a digital signal processing (DSP) block that includes multiple weight registers configurable to receive and store a first plurality of values having multiple precisions, and multiple multipliers that are each configurable to receive a respective value of the first plurality of values. The DSP block further includes one or more inputs configurable to receive a second plurality of values, and a multiplexer network configurable to receive the second plurality of values and route each respective value of the second plurality of values to a multiplier of the multipliers. The multipliers are configurable to simultaneously multiply each value of the first plurality of values by a respective value of the second plurality of values to generate a plurality of products. Additionally, the DSP block includes adder circuitry configurable to generate a first sum and a second sum based on the plurality of products.

20 Claims, 17 Drawing Sheets

(56) References Cited

U.S. PATENT DOCUMENTS

| | | |
|---|---|---|
| 2019/0042538 A1 | 2/2019 | Koren et al. |
| 2019/0228051 A1 | 7/2019 | Langhammer et al. |
| 2020/0326948 A1 | 10/2020 | Langhammer |
| 2020/0327271 A1 | 10/2020 | Langhammer et al. |
| 2020/0349420 A1 | 11/2020 | Ovsiannikov .......... G06N 3/045 |
| 2021/0182022 A1 | 6/2021 | Langhammer et al. |
| 2021/0182023 A1 | 6/2021 | Langhammer et al. |
| 2021/0182465 A1 | 6/2021 | Langhammer ............ G06F 7/57 |
| 2022/0035890 A1 | 2/2022 | Liu ...................... G06F 7/5443 |

OTHER PUBLICATIONS

Z. Song et al., "DRQ: Dynamic Region-based Quantization for Deep Neural Network Acceleration," 2020 ACM/IEEE 47th Annual International Symposium on Computer Architecture (ISCA), Valencia, Spain, 2020. (Year: 2020).

Extended European Search Report for EP Application No. 20196629.8 mailed Mar. 9, 2021.

Extended European Search Report for EP Application No. 20196801.3 mailed Mar. 10, 2021.

Extended European Search Report for EP Application No. 20196562.1 mailed Mar. 10, 2021.

SYSTEMS AND METHODS FOR STRUCTURED MIXED-PRECISION IN A SPECIALIZED PROCESSING BLOCK

BACKGROUND

The present disclosure relates generally to integrated circuit (IC) devices such as programmable logic devices (PLDs). More particularly, the present disclosure relates to a processing block (e.g., a digital signal processing (DSP) block) that may be included on an integrated circuit device as well as applications that can be performed utilizing the processing block.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices may be used for a variety of purposes or applications, such as machine learning or artificial intelligence (AI) applications. In some cases, machine learning and AI architectures may need a large amount of compute and processing power to carry out processing. Sparsity may be used to reduce the amount of compute needed for performing AI operations. Sparsity may require retraining of hardware, which may be time consuming and require a large device power output to achieve. Instead, structured mixed-precision operations may be implemented in AI architectures. The structured multi-precision operations may reorganize regular trained networks without the need for retraining, while still delivering compute and power savings.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
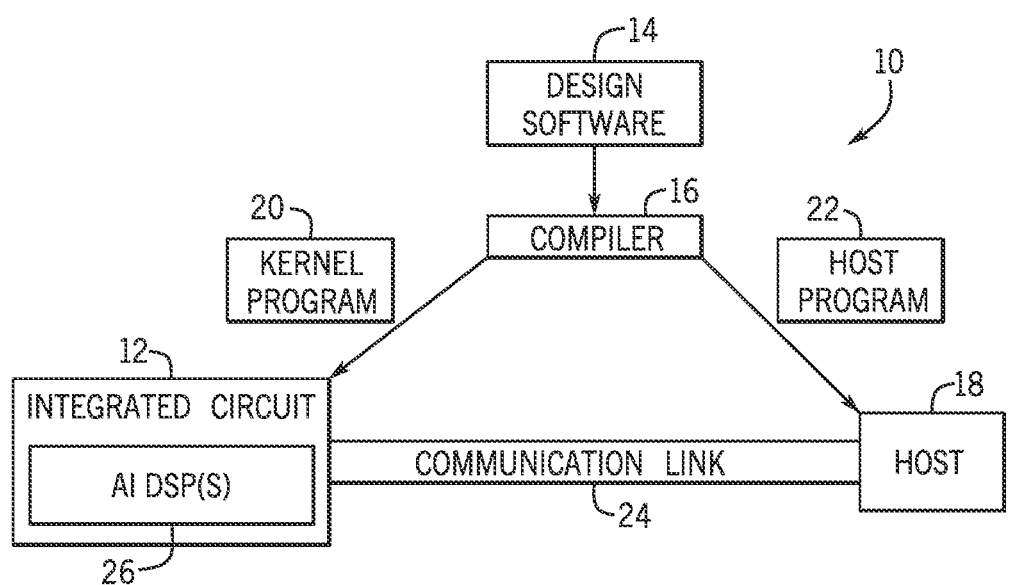
FIG. 1 is a block diagram of a system that may implement arithmetic operations using a digital signal processing (DSP) block, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As machine learning and artificial intelligence applications have become ever more prevalent, there is a growing desire for circuitry to perform calculations used in machine learning and artificial intelligence applications. To enable efficient hardware designs, the same circuitry may also be desired to extend digital signal processing (DSP) block functionality to implement mixed-precision operations. The presently described techniques relate to embodiments of a DSP block that may be included in an integrated circuit device (e.g., a programmable logic device such as a field programmable gate arrays (FPGA)) and implement structured mixed-precision modes (e.g., involving one or more relatively higher precision values and one or more relatively lower precision integer values) using minimal routing resources. In general, a DSP block is a type of circuitry that may be used in integrated circuit devices, including programmable logic devices such as (FPGAs), to perform multiplication, accumulation, and addition operations. Thus, while the discussion below may discuss a DSP block or operations performed by a DSP block in the context of an FPGA, it should be noted that the techniques described herein may be implemented in other types of integrated circuit devices and programmable logic device.

The DSP block described herein may harness the flexibility of an FPGA to adapt to emerging algorithms or fix bugs in a planned implementation. As discussed herein, the DSP block may extend tensor columns to perform multi-precision operations by implementing tensor columns that may be decomposed into sub-columns. The tensor columns may include multi-level crossbar architectures corresponding to multiplexer patterns that may be applied to different activation inputs of the sub-columns to select inputs according to the precision (e.g., low precision, high precision) of each input of the DSP block. In addition, the mixed-precision operations may include using multiplexer patterns within the tensor columns of the DSP block to enable routing of register inputs to multiple multipliers within the DSP block. Further, the DSP block may use the activation broadcast across multiple DSP blocks and cascade output values from one DSP block to another to perform large number calculations. The mixed-precision operations may involve cascading data including two outputs from each tensor column across DSP blocks, thereby enabling larger value calculations to be performed using the DSP blocks.

The presently described techniques enable compute savings of approximately twenty-five percent relative to sparsity operations in DSP blocks (e.g., operations in which some values are zero), with negligible accuracy loss in mixed-precision operation output. The matrices in a trained network may be sorted by weight dynamic ranges and quantized to groups of precisions that correspond to precisions supported by the DSP block hardware. The mixed-precision operations may use existing trained networks to load mapping information along with weight values into the tensor columns of the DSP block to reorder activations to their corresponding weight regions.

With this in mind, FIG. 1 illustrates a block diagram of a system 10 that may implement arithmetic operations using a DSP block. A designer may desire to implement functionality, such as, but not limited to, machine learning or AI operations, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of one or more DSP blocks 26 on the integrated circuit device 12. The DSP block 26 may include circuitry to implement, for example, operations to perform matrix-matrix or matrix-vector multiplication for AI or non-AI data processing. The integrated circuit device 12 may include many (e.g., hundreds or thousands) of the DSP blocks 26. Additionally, DSP blocks 26 may be communicatively coupled to another such that data outputted from one DSP block 26 may be provided to other DSP blocks 26.

While the techniques above discussion described to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
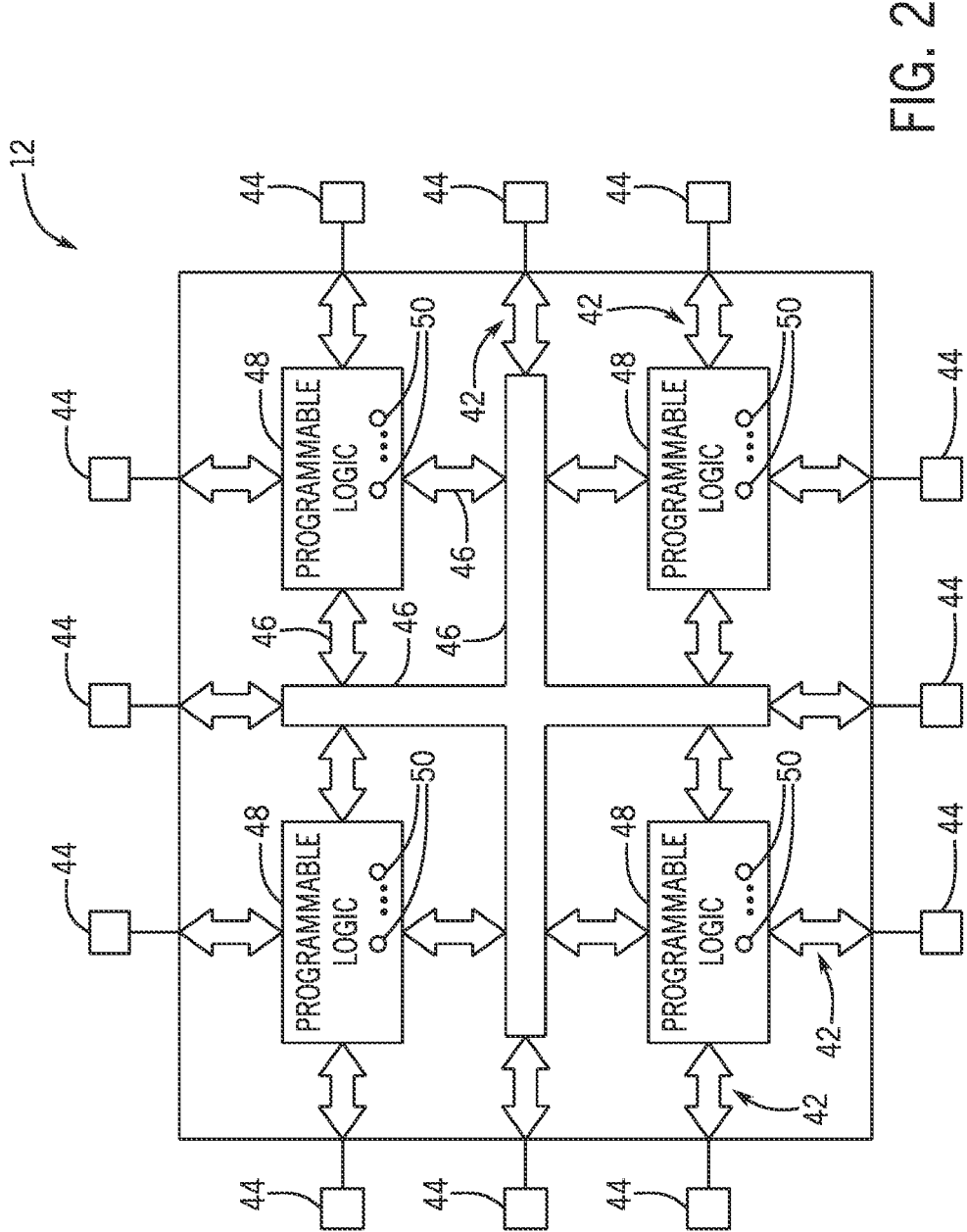
FIG. 2 is a block diagram of the integrated circuit device of FIG. 1, in accordance with an embodiment of the present disclosure.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of integrated circuit device (e.g., an application-specific integrated circuit and/or application-specific standard product). As shown, the integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (e.g., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of the programmable logic 48.

Programmable logic devices, such as integrated circuit device 12, may contain programmable elements 50 within the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
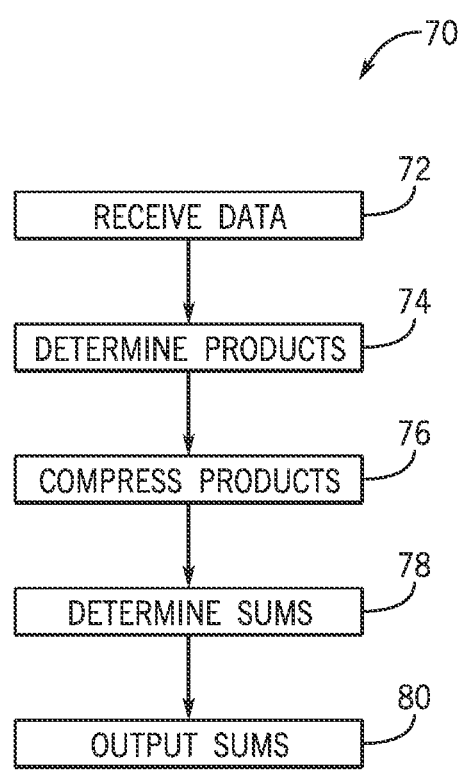
FIG. 3 is a flow diagram of a process that the DSP block of the integrated circuit device of FIG. 1 may perform when conducting multiplication operations, in accordance with an embodiment of the present disclosure.

Keeping the foregoing in mind, the DSP block 26 discussed here may be used for a variety of applications and to perform many different operations associated with the applications, such as multiplication and addition. For example, matrix and vector (e.g., matrix-matrix, matrix-vector, vector-vector) multiplication operations may be well suited for both AI and digital signal processing applications. As discussed below, the DSP block 26 may simultaneously calculate many products (e.g., dot products) by multiplying one or more rows of data by one or more columns of data. Before describing circuitry of the DSP block 26, to help provide an overview for the operations that the DSP block 26 may perform, FIG. 3 is provided. In particular, FIG. 3 is a flow diagram of a process 70 that the DSP block 26 may perform, for example, on data the DSP block 26 receives to determine the product of the inputted data. Additionally, it should be noted the operations described with respect to the process 70 are discussed in greater detail with respect to subsequent drawings.

At process block 72, the DSP block 26 receives data. The data may include values that will be multiplied. The data may include fixed-point and floating-point data types. In some embodiments, the data may be fixed-point data types that share a common exponent. Additionally, the data may be floating-point values that have been converted for fixed-point values (e.g., fixed-point values that share a common exponent). As described in more detail below with regard to circuitry included in the DSP block 26, the inputs may include data that will be stored in weight registers included in the DSP block 26 as well as values that are going to be multiplied by the values stored in the weight registers.

At process block 74, the DSP block 26 may multiply the received data (e.g., a portion of the data) to generate products. For example, the products may be subset products (e.g., products determined as part of determining one or more partial products in a matrix multiplication operation) associated with several columns of data being multiplied by data that the DSP block 26 receives. For instance, when multiplying two matrices, values of a row of one matrix may be multiplied by values of a column of the other matrix to generate the subset products.

At process block 76, the DSP block 26 may compress the products to generate vectors. For example, as described in more detail below, several stages of compression may be used to generate vectors that the DSP block 26 sums.

At process block 78, the DSP block 26 may determine the sums of the compressed data. For example, for subset products of a column of data that have been compressed (e.g., into fewer vectors than there were subset products), the sum of the subset products may be determined using adding circuitry (e.g., one or more adders, accumulators, etc.) of the DSP block 26. Sums may be determined for each column (or row) of data, which as discussed below, correspond to columns (and rows) of registers within the DSP block 26. Additionally, it should be noted that, in some embodiments, the DSP block 26 may convert fixed-point values to floating-point values before determining the sums at process block 78.

At process block 80, the DSP block 26 may output the determined sums. As discussed below, in some embodiments, the outputs may be provided to another DSP block 26 that is chained to the DSP block 26.

Figure 4:
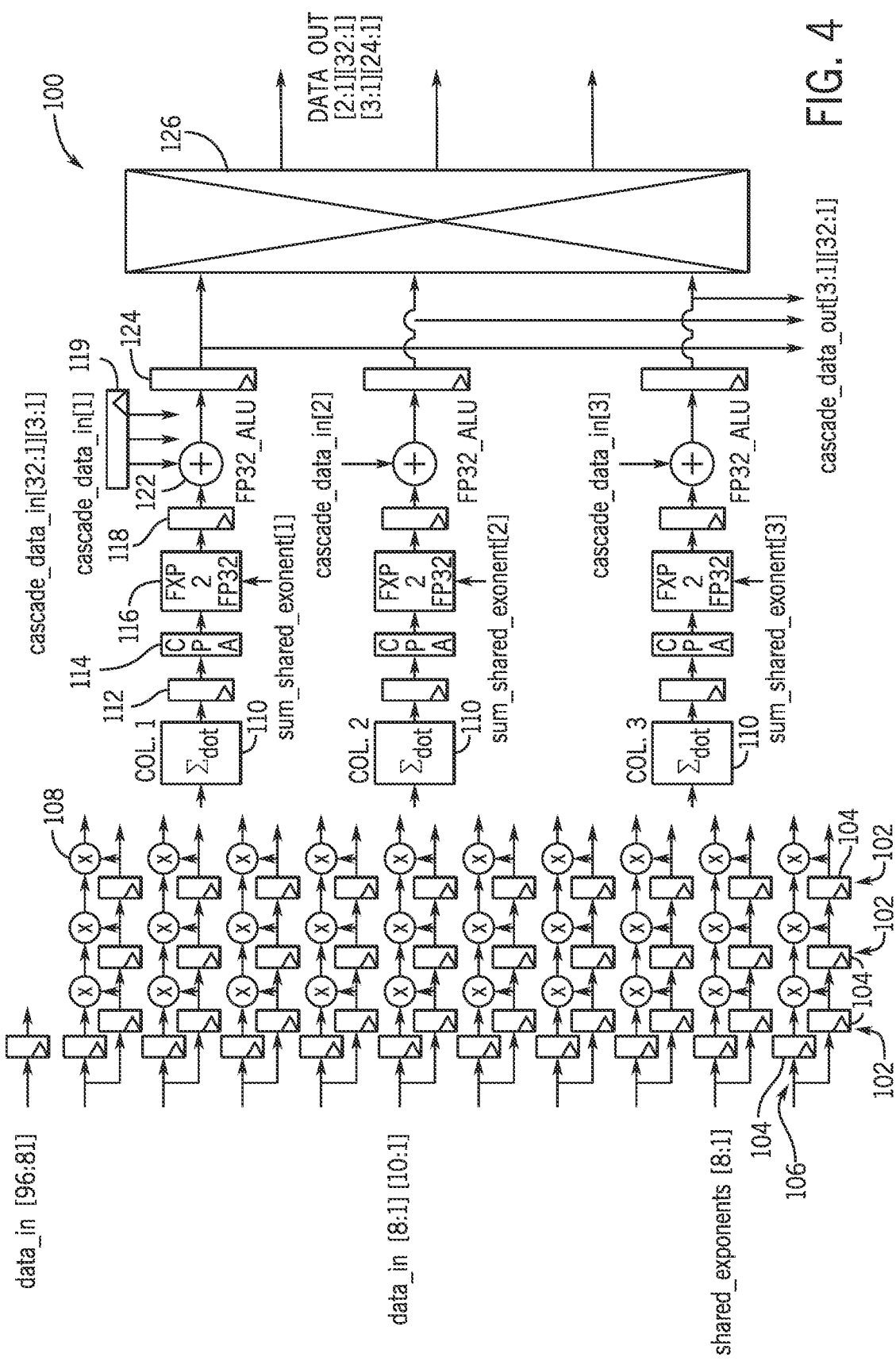
FIG. 4 is a block diagram of a virtual bandwidth expansion structure implementable via the DSP block of FIG. 1, in accordance with an embodiment of the present disclosure.

Keeping the discussion of FIG. 3 in mind, FIG. 4 is a block diagram illustrating a virtual bandwidth expansion structure 100 implemented using the DSP block 26. The virtual bandwidth expansion structure 100 includes columns 102 of registers 104 that may store data values the DSP block 26 receives. For example, the data received may be fixed-point values, such as four-bit or eight-bit integer values. In other embodiments, the received data may be fixed-point values having one to eight integer bits, or more than eight integer bits. Additionally, the data received may include a shared exponent in which case the received data may be considered as floating-point values. While three columns 102 are illustrated, in other embodiments, there may be fewer than three columns 102 or more than three columns 102. The registers 104 of the columns 102 may be used to store data values associated with a particular portion of data received by the DSP block 26. For example, each column 102 may include data corresponding to a particular column of a matrix when performing matrix multiplication operations. As discussed in more detail below, data may be preloaded into the columns 102, and the data can be used to perform multiple multiplication operations simultaneously. For example, data received by the DSP block 26 corresponding to rows 106 (e.g., registers 104) may be multiplied (using multipliers 108) by values stored in the columns 102. More specifically, in the illustrated embodiment, ten rows of data can be received and simultaneously multiplied with data in three columns 102, signifying that thirty products (e.g., subset products) can be calculated. It should be understood that nay suitable number of rows of data may be received and any number of the multipliers 108 (e.g., 8, 9, 10) may be implemented to calculate a desired amount of products.

For example, when performing matrix-matrix multiplication, the same row(s) or column(s) is/are may be applied to multiple vectors of the other dimension by multiplying received data values by data values stored in the registers 104 of the columns 102. That is, multiple vectors of one of the dimensions of a matrix can be preloaded (e.g., stored in the registers 104 of the columns 102), and vectors from the other dimension are streamed through the DSP block 26 to be multiplied with the preloaded values. Registers 104 that are used to store preloaded values may be referred to as "weight registers." Accordingly, in the illustrated embodiment that has three columns 102, up to three independent dot products can be determined simultaneously for each input (e.g., each row of data). Additionally, when the DSP block 26 is using structured mixed-precision mode, each column 102 may include sub-columns with higher precision multipliers and lower precision multipliers that may result in six independent (dot) products being determined simultaneously for each input of each of the three tensor columns 102. As discussed below, these features may be used to multiply values while implementing structured mixed-precision operations. Further, as noted above, the DSP block 26 may also receive data (e.g., eight bits of data) for the shared exponent of the data being received and may provide data specifying a specific multiplexer control pattern associated with a specific multiplexer network when the DSP block is operating in structured mixed-precision mode. This enables received data to be routed to the corresponding cascaded data values for multiplication during the structured mixed-precision mode operations of the DSP block 26.

The partial products for each column 102 may be compressed, as indicated by the compression blocks 110 to generate one or more vectors (e.g., represented by registers 112), which can be added via carry-propagate adders 114 to generate one or more values. Fixed-point to floating-point conversion circuitry 116 may convert the values to a floating-point format, such as a single-precision floating point value (e.g., FP32) as provided by IEEE Standard 754, to generate a floating-point value (represented by register 118). Additionally, multiplexer network circuitry and routing circuitry may also be implemented as desired across the DSP block 26 to correspond to certain precisions (e.g., 4-bit integers, 8-bit integers) during structured mixed-precision operations performed by each column 102.

The DSP block 26 may be communicatively coupled to other DSP blocks 26 such that the DSP block 26 may receive data from, and provide data to, other DSP blocks 26. For example, the DSP block 26 may receive data from another DSP block 26, as indicated by cascade input 119, which may include data that will be added (e.g., via adder 122) to generate a value (represented by register 124). Values may be provided to a multiplexer selection circuitry 126, which selects values, or subsets of values, to be output out of the DSP block 26 (e.g., to circuitry that may determine a sum for each column 102 of data based on the received data values.) The outputs of the multiplexer selection circuitry 126 may be floating-point values, such as FP32 values or floating-point values in other formats such as bfloat24 format (e.g., a value having one sign bit, eight exponent bits, and sixteen implicit (fifteen explicit) mantissa bits), bfloat16 format (e.g., a value having one sign bit, eight exponent bits, and seven explicit mantissa bits), bfloat20 format (e.g., a value having one sign bit, eight exponent bits, and eleven explicit mantissa bits), or any suitable format. Each of the tensor columns 102 may be subdivided into two or more sub-tensor columns and use the multipliers 108 to produce two values (e.g., products or partial products) that may each be added (e.g., via two adders 122) with streamed values to generate two values that may be streamed to another DSP block 26. This may result in six output values being cascaded out of each DSP block 26 to a subsequent DSP block 26 (e.g., when operating in a structured mixed-precision mode). This may enable the DSP block 26 to expand structured mixed-precision mode operations for large number calculations, while using minimal routing resources. Furthermore, while six output values are described as being cascaded from one DSP block 26 to another, a different mount of values may be cascaded depending on the mode of operation of the DSP block 26 as well as a type of the values (e.g., FP32 values or bfloat24 values) to be cascaded.

As discussed above, it may be beneficial for a DSP block 26 that extends AI tensor processing to also enable performance of structured mixed-precision operations. This may include the ability of the DSP block 26 to perform structured mixed-precision operations by configuring the tensor circuitry to implement specific multiplexer patterns based on the precisions used for the input values, which enables the DSP block 26 to route low-precision values and high-precision values to be separately routed and operated on (e.g., by multiplier and adder circuitry) for one or more operations that will be performed on the values. Additionally, the ability to implement structured mixed-precision operations using multiplexer control network operations enables the DSP block 26 to reduce the amount of routing resources used for the structured mixed-precision calculations. Thus, the ability of the DSP block 26 to be configured for different precisions via multiplexer control networks and routing networks increases the efficiency of the DSP block 26.

Figure 5:
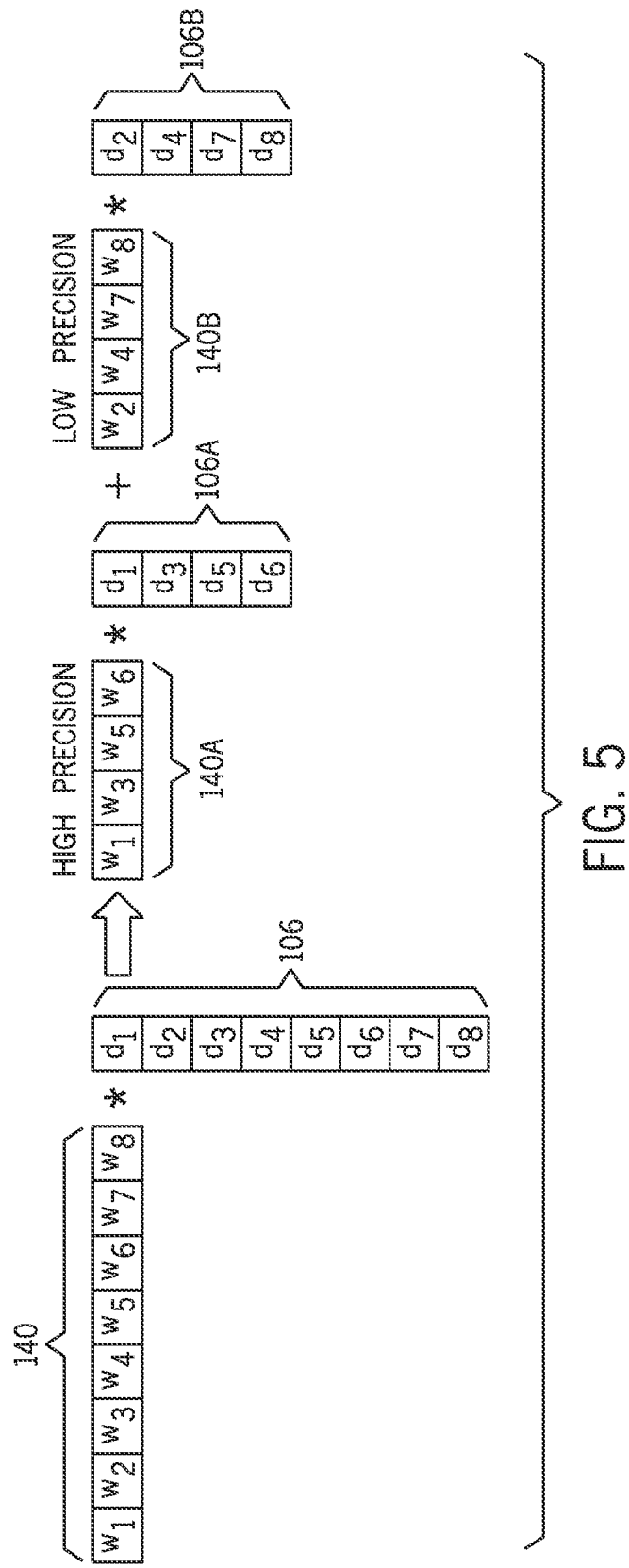
FIG. 5 is a diagram of a mixed-precision multiplication operation that may be performed using the DSP block of FIG. 1, in accordance with an embodiment of the present disclosure.

With the foregoing in mind FIG. 5 is a diagram illustrating a mixed-precision multiplication operation that may be performed by the DSP block 26. More specifically, weight register input values 140 (e.g., $w_1$-$w_8$) may be mixed-precision values, meaning each of the weight register input values 140 may be either a relatively higher precision value or a relatively lower precision value. As a non-limiting example, the weight register input values 140 the relatively higher precision values may be eight-bit integers value, while the relatively lower precision values may be four-bit integer values. In the illustrated example, structured mixed-precisions operations may assign 50% of the weight register input values 140 to a high precision value (e.g., an eight-bit integer value) and assign 50% of the weight register input values 140 to a lower precision value (e.g., a four-bit integer value). Before continuing to discuss FIG. 5 in more detail, it should be noted that, in other instances, mixed-precision operations may involve other amounts (e.g., percentages) of high precision and low precision values. For example, in other embodiments, the weight register input values 140 may be 75% high precision values and 25% low precision values, 25% high precision values and 75% low precision values, or any other combination of percentages that sum to 100%.

A network of the DSP blocks 26 may be quantized to an eight-bit integer value. This may correspond to a 1×8 block of values (e.g., weight register input values 140) that are multiplied by corresponding 1×8 block of activation values 106 (e.g., other integer values) that are streamed into tensor columns 102 of the DSP block 26. For example, the weight register input value 140 may be stored in weight registers 104 of FIG. 3, and the activation values 106 may correspond to the rows 106 of data of FIG. 3 that are streamed through the DSP block 26. In this example of a structured mixed-precision operation, 50% of the input weight values will be higher precision values and 50% will be lower precision values. The weight register input values 140 within the weight block may be input into the weight registers 104 of the tensor column 102 of the DSP block 26 and the activation values 106 may be streamed into the DSP block 26. The tensor columns 102 may include one or more networks that may route the weight register input values 140 to the multipliers 108 according to the precision of the weight register input values 140. More specifically, in the embodiment illustrated in FIG. 5, four of the weight register input values 140 ($w_1$, $w_3$, $w_5$, and $w_6$) may correspond to eight-bit integer values and may be designated as high precision weight values 140A, while $w_2$, $w_4$, $w_7$, and $w_8$ of the weight register input values 140 may correspond to lower precision weight values 140B, such as four-bit integer values. The high precision weight values 140A may be multiplied by corresponding activation values 106A $d_1$, $d_3$, $d_5$, and $d_6$, and the low precision weight values 140B may be multiplied by $d_2$, $d_4$, $d_7$, and $d_8$ of the activation values 106B.

Figure 6:
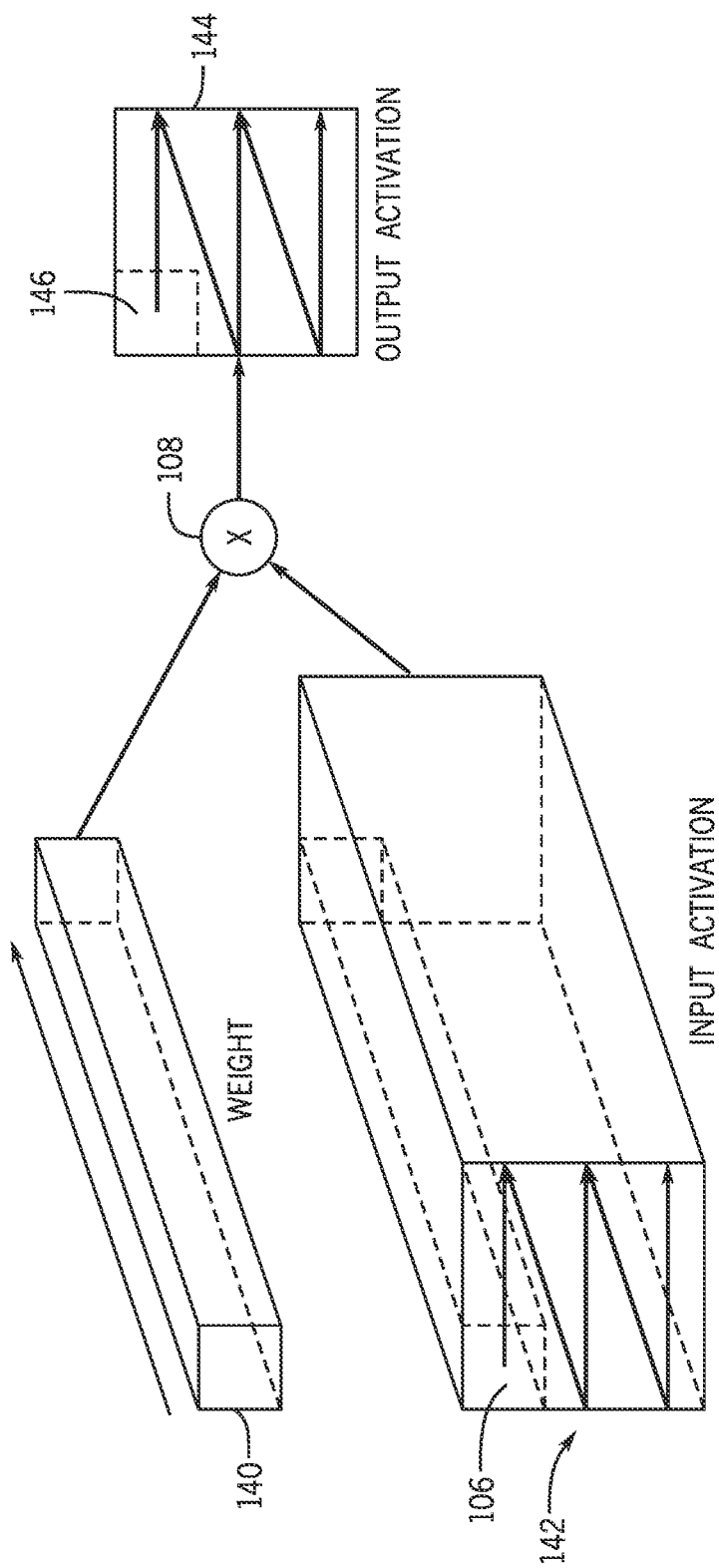
FIG. 6 is a diagram of multiplication operation between of an input activation and weight register input values to generate an output activation that may be performed using the DSP block of FIG. 1, in accordance with an embodiment of the present disclosure.

Keeping the foregoing in mind, FIG. 6 is a diagram illustrating multiplication of an input activation 142 and the weight register input values 140 to generate an output activation 144 that may be performed by the DSP block 26, in accordance with an embodiment of the present disclosure. The weight register input values 140 may be partitioned into blocks to leverage hardware operations and increase processing efficiency. For example, 4-dimensional (h, w, d, c,) tensor blocks may be used, where h is height, w is the weight, d is depth, and c is number of output channels. Each of the output channels may be processed independently, and a 1×1 convolution filter may be applied to manage model complexity, setting values of h=1 and w=1 respectively. The weight register input values 140 corresponding to each of the lxi convolutions may have elements in the depth dimension. The weight register input values 140 may be processed in a depth-first order to support the lxi convolution filters and any other suitable filters. The weight register input values 140 may be routed to the multiplier 108 (e.g., high precision, low precision) along with a sub-tensor input of the input activations 106 in a depth-first order. The output of the multiplier 108 may correspond to an output activation value 144 that may be routed to one or more compression blocks 110 to generate one or more vectors. More specifically, the multiplication of the weight register input values 140 and the activation values 106 (which may be included in the input activation 142), may result in a portion of the output activation 144, which may be considered a channel of the output activation 146. Additionally, the activation values 106 may be full precision values, even when the precision of some or all of the weight register input values 140 may be lower precision values relative to the activation values 106. In other words, the activation values 106 may be high precision values, low precision values, or a combination of high precision values and values have one or more precisions lower than the high precision values. The weight register input values 140 may be multiplied by other blocks (e.g., channels) of the activations values 106 included in the input activation 142 to generate the remaining portions of the output activation 144.

Figure 7:
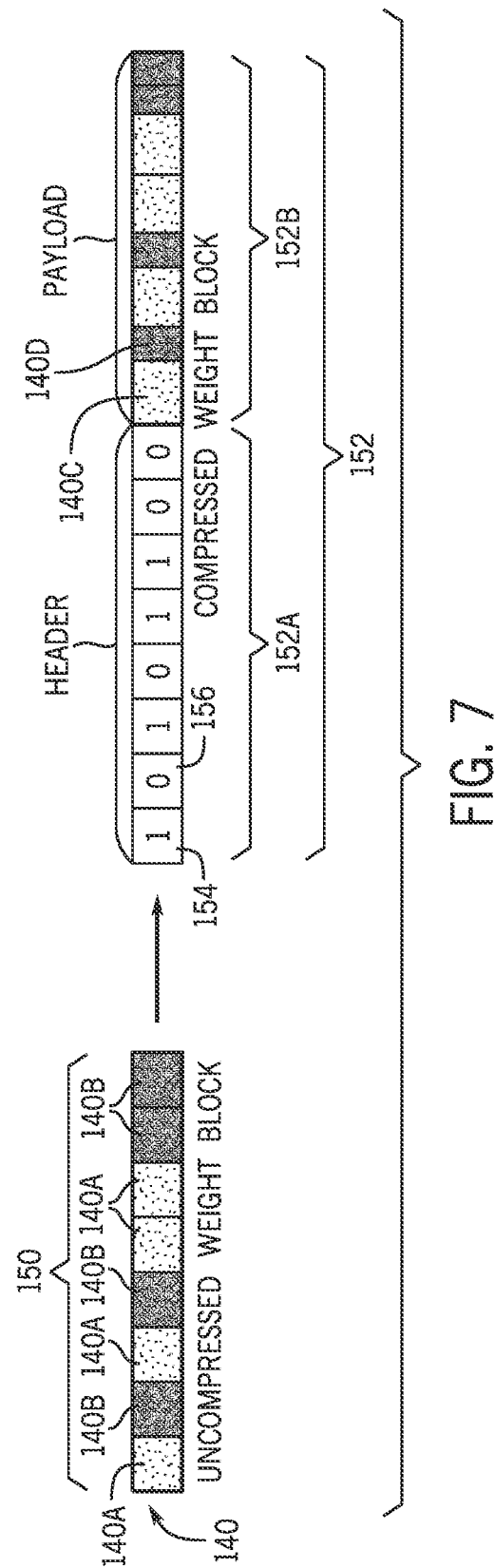
FIG. 7 is an illustration of weight block compression for structured mixed-precision operations, in accordance with an embodiment of the present disclosure.

The weight depth may be partitioned according to the desired depth, as demonstrated in FIG. 7, which is an illustration of weight block compression for structured mixed-precision in the DSP block 26, in accordance with an embodiment of the present disclosure. In the illustrated embodiment, the weight block 150 that includes the weight register input values 140 may be partitioned into a 1×8 block, but in other embodiments, any other suitable partition may be used. The last weight register input value 140 (e.g., $w_8$) may be padded if there are an insufficient number of elements to correspond to the 1×8 block size. For example, 50% of the values of the weight block 150 may be assigned higher precision values (e.g., high precision weight values 140A) and 50% of the values may be assigned to lower precision values (e.g., low precision weight values 140B).

The weight block 150 may be compressed by the DSP block 26 or other circuitry included in the integrated circuit device 12 so that the values are stored in a compressed weight block 152. During the weight block compression, a header 152A is added to the beginning of the compressed weight block 152 that includes binary (e.g., 0 and 1) values to indicate if the corresponding value within the compressed weight block 152 is a lower precision value or a higher precision value. For example, a first value 140C within the payload values 152B of the compressed weight block 152 may be a higher precision value, and a corresponding first value 154 within the header 152A may be a "1" to signify the first value is high precision. A second value 140D within the payload values 152B of the compressed weight block 152 may be a lower precision value, and a corresponding second value 156 of the header 152A may be a "0" to indicate that the second value 140D is a low precision value. In this manner, the header 152A may indicate precision of the values within the payload values 152B of the compressed weight block 152. During structured mixed-precision operations, the tensor column hardware of the DSP block 26 may use the structured mixed-precision pattern within the weight matrix to increase computation speed. The header 152A may be used to partition the weight register input values 140 and route the input data values to the appropriate multiplier 108 within the tensor column 102, as demonstrated in FIG. 8.

Figure 8:
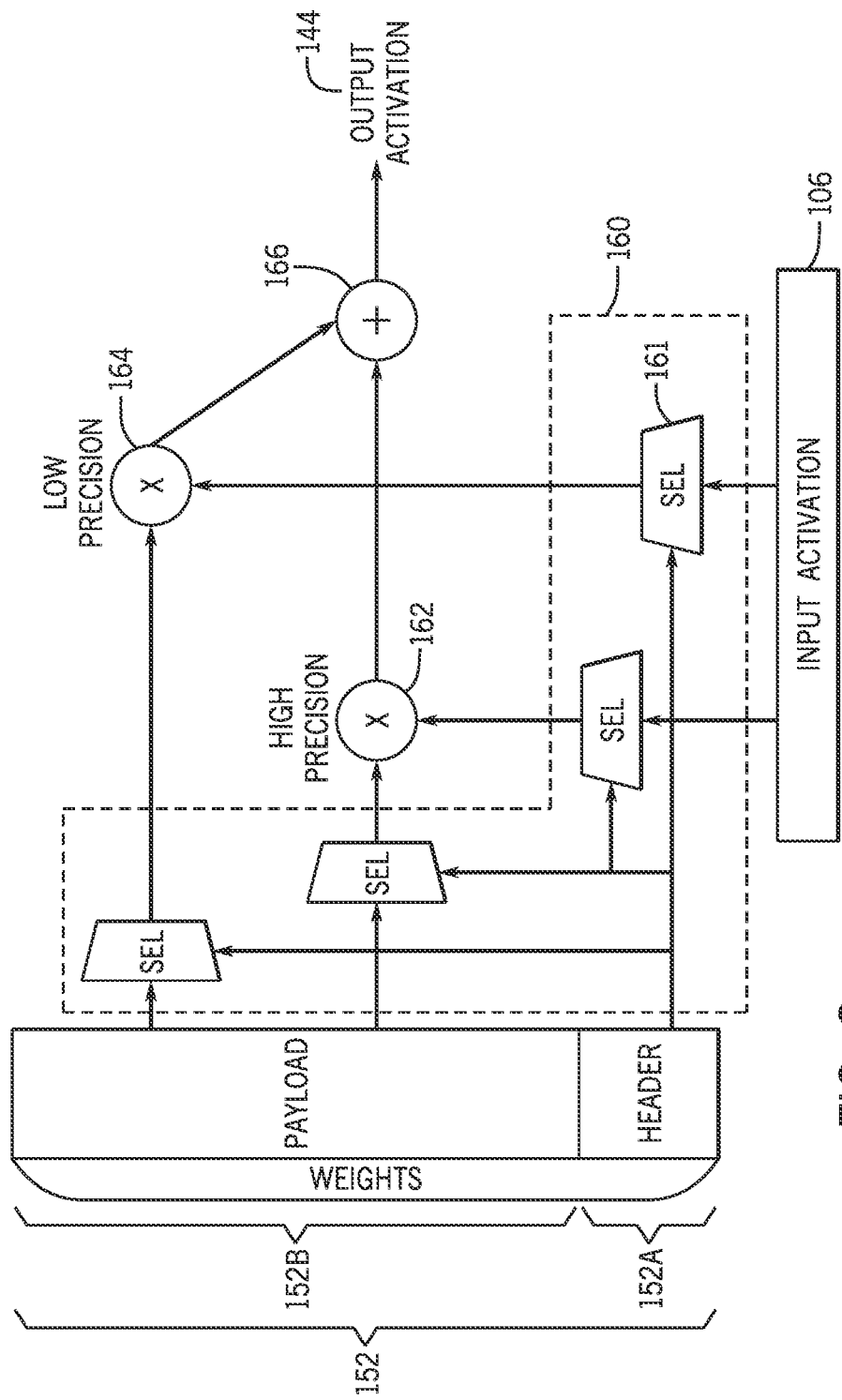
FIG. 8 is a block diagram of a tensor column for structured mixed-precision operations in the DSP block of FIG. 1, in accordance with an embodiment of the present disclosure.

In particular, FIG. 8 is a block diagram of a hardware implementation (which may be implemented in the DSP block 26) capable of performing structured mixed-precision operations using the compressed weight block 152, in accordance with an embodiment of the present disclosure. Each of the tensor columns 102 within the DSP block 26 may include a multiplexer network 160 (which includes one or more multiplexers (e.g., "Sel" multiplexers illustrated in FIG. 8) that receive and route input activation values 106 to a particular multiplier (e.g., a high precision multiplier 162 or a low precision multiplier 164, both of which may be included in the multipliers 108) based on the precisions of the weight register input values 140. For example, the values within the header 152A may indicate the payload values 152B correspond to high precision values or low precision values. The header values 152A may be input to each multiplexer of the multiplexer network 160 to indicate that the payload value 152B is a high precision value or low precision value. The multiplexers of the multiplexer network 160 may route the payload value 152B to the corresponding high precision multipliers 162 or low precision multipliers 164 based upon the indicator values (e.g., 0, 1) within the header 152A. The payload value 152B may correspond to the low precision or high precision values that are routed, via the multiplexer network 160, to low precision multipliers 164 if the value corresponds to low precision, or the high precision multipliers 162 if the value within the weight block corresponds to high precision. The input activation values 106 may also be routed, via the multiplexer network 160, to low precision multipliers 164 or high precision multipliers 162 based on the precision of the payload values 152B as indicated by the header values 152A. Accordingly, high precision values and low precision values of the payload 152 may be routed to an appropriate multiplier and multiplied by a corresponding value of the input activation values 106. The outputs from the low precision multiplier 164 and high precision multiplier 162 are then routed to an adder 166 (e.g., adder circuitry included in the compression block 110, carry-propagate adder 114, or other adder circuitry that may be included in the DSP block 26) that adds the values and the added values are cascaded out of the tensor column 102 as output activations 144 from the DSP block 26.

The structured mixed-precision operations within the DSP block 26 have been analyzed and the memory compression ratio may be computed using 8-bit values for high precision. The compression ratio may be calculated based on the block size (l, w), the percentage of low precision values within the block (p), and the number of bits allocated for the low precision values (q) according to the below Equation 1:

$$m = \begin{cases} \dfrac{8-7p}{8} & q = 1 \\ \dfrac{p(q-8)+9}{8} & q > 1 \end{cases} \qquad \text{Equation 1}$$

For low precision values greater than one, the overhead of this technique is the one bit header value 152B used to keep track of the positions of the low and high precision elements within the compressed weight block 152. For precision values that are equal to 1, only the header value is needed for lower precision bits because the lower precision values are quantified to zero. The performances according to the percentage of low precision values within the block and number of bits allocated for low precision values are shown in Table 1 below:

TABLE 1

|   | p = 0.25 | p = 0.50 | p = 0.75 |
| --- | --- | --- | --- |
| q = 1 (structured sparse) | 78.1% | 56.3% | 34.4% |
| q = 2 (int8 + int2) | 93.4% | 75% | 56.3% |
| q = 3 (int8 + int3) | 97% | 81.3% | 66% |
| q = 4 (int8 + int4) | 100% | 87.5% | 75% |

Additionally, the performance relative to the compute ratio was examined for the structure mixed-precision operations in DSP blocks 26. The compute ratio may depend on both p and q(c). For example, if it is assumed that eight-bit integer value multiplication costs about twice as much as four-bit integer values multiplication, the relative compute cost may then be calculated according to Equation 2:

$$c = \begin{cases} \dfrac{8lw(1-p)}{8lw} = 1-p & q = 1 \\ \dfrac{8lw(1-p)+qlwp}{8lw} = \dfrac{1}{8}p(q-8)+1 & q > 1 \end{cases} \qquad \text{Equation 2}$$

The relative cost is displayed in the Table 2 below according to percentage of low precision values within the block (p) and number of bits allocated for the low precision values (q).

TABLE 2

|   | p = 0.25 | p = 0.50 | p = 0.75 |
| --- | --- | --- | --- |
| q = 1 (structured sparse) | 75% | 50% | 25% |
| q = 2 (int8 + int2) | 81.3 | 62.5 | 43.8 |
| q = 3 (int8 + int3) | 84.4% | 68.8% | 53.1% |
| q = 4 (int8 + int4) | 87.5% | 75% | 62.5% |

Thus, the structured mixed-precision method for DSP block 26 operations was found to reduce memory bandwidth utilized by compressing the weights, and found to reduce computational complexity in comparison to sparsity methods that may use 0 values for lower precision values.

Figure 9:
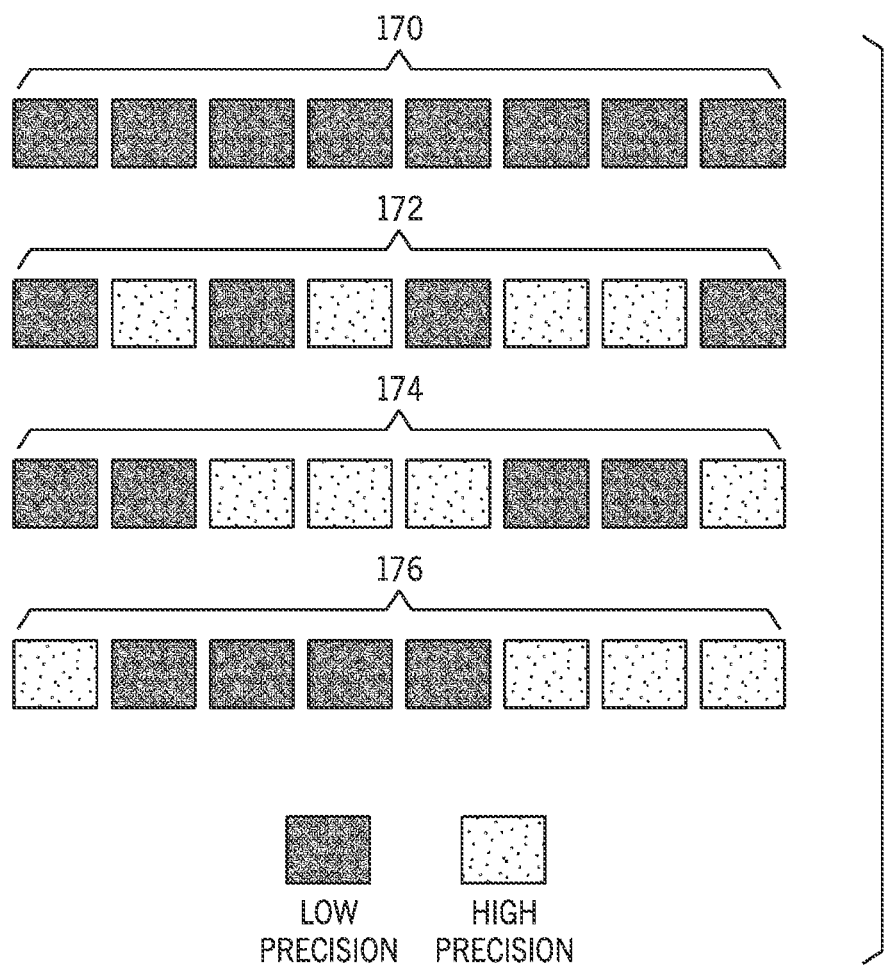
FIG. 9 illustrates a mixed-precision weight distribution that may be implemented within the tensor column of FIG. 4 and the DSP block of FIG. 1, in accordance with an embodiment of the present disclosure.

With the foregoing in mind, FIG. 9 is an example of mixed-precision weight distribution that may be implemented within the tensor column 102, in accordance with an embodiment of the present disclosure (and other embodiments discussed herein), in accordance with embodiments of the present disclosure. The tensor column 102 may be able to implement multiple precision mixes where multiple precisions may be used (e.g., 8-bits, 6-bits, 4-bit, 2-bits) to designate higher precision values and lower precision values. The mixed-precision distribution may be randomized to implement a power saving core, but may also be organized into precision groups to implement a dense compute core. It should be understood, that all the activation values 106 may be full precision, and some of the weights register input values 140 will be lower precision relative to the input activations 142.

In some embodiments, the DSP block 26 may perform calculations without mixed-precision. For example, a first row 170 may represent a regular vector with no mixed-precision (e.g., all values full/high precision). Each box of the first row 170 may correspond to the weight register 104 inputs of the tensor column 102. In another embodiment, mixed-precision may be implemented and 50% of the values may be a high precision value (e.g., 8-bit) and 50% of the values may be a low precision value (e.g., 4-bit) value.

The second row, 172, third row 174 and fourth row 176 correspond to other arrangements of mixed-precision values, that represent 50% high precision values and 50% low precision values. In some embodiments, multiple precisions may be used within the rows and the ratio of high precision to low precision values may vary. Thus, it should be understood that any arrangement of mixed-precision values may be implemented to use for structured mixed-precision operations in the tensor columns 102 of the DSP block 26.

Figure 10A:
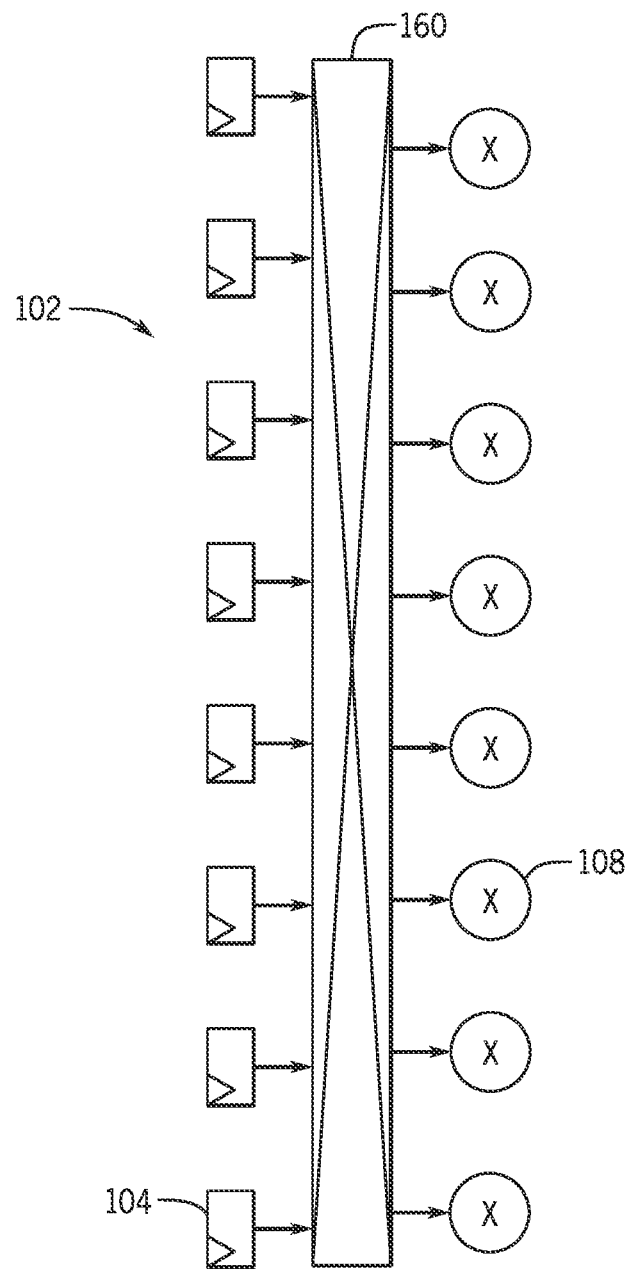
FIG. 10A is schematic diagram of a tensor column of the DSP block of FIG. 1 for implementing structured mixed-precision operations, in accordance with an embodiment of the present disclosure.

With the foregoing in mind, FIG. 10A is schematic diagram of a tensor column 102 with the multiplexer network 160 (which may be implemented using a crossbar wiring structure) for implementing structured mixed-precision mode, in accordance with an embodiment of the present disclosure. Each value of the registers 104 (e.g., values of the compressed weight block 152 including header bits, payload bits, or both) may be streamed to the multiplexer network 160 to enable mixed-precisions operations to be performed. The multiplexer network 160 receives the values and routes the values among eight multipliers 108 (e.g., higher precision multipliers, lower precision multipliers) corresponding to each register for further processing. Thus, the multiplexer network 160 enables each register 104 to be connected to each multiplier 108. The activation values 106 may be streamed to any of the multipliers 108 based on the preloaded high precision value or low precision values stored in the weight registers of the tensor column 102 (e.g., to perform the multiplication operation illustrated in FIG. 5).

Figure 10B:
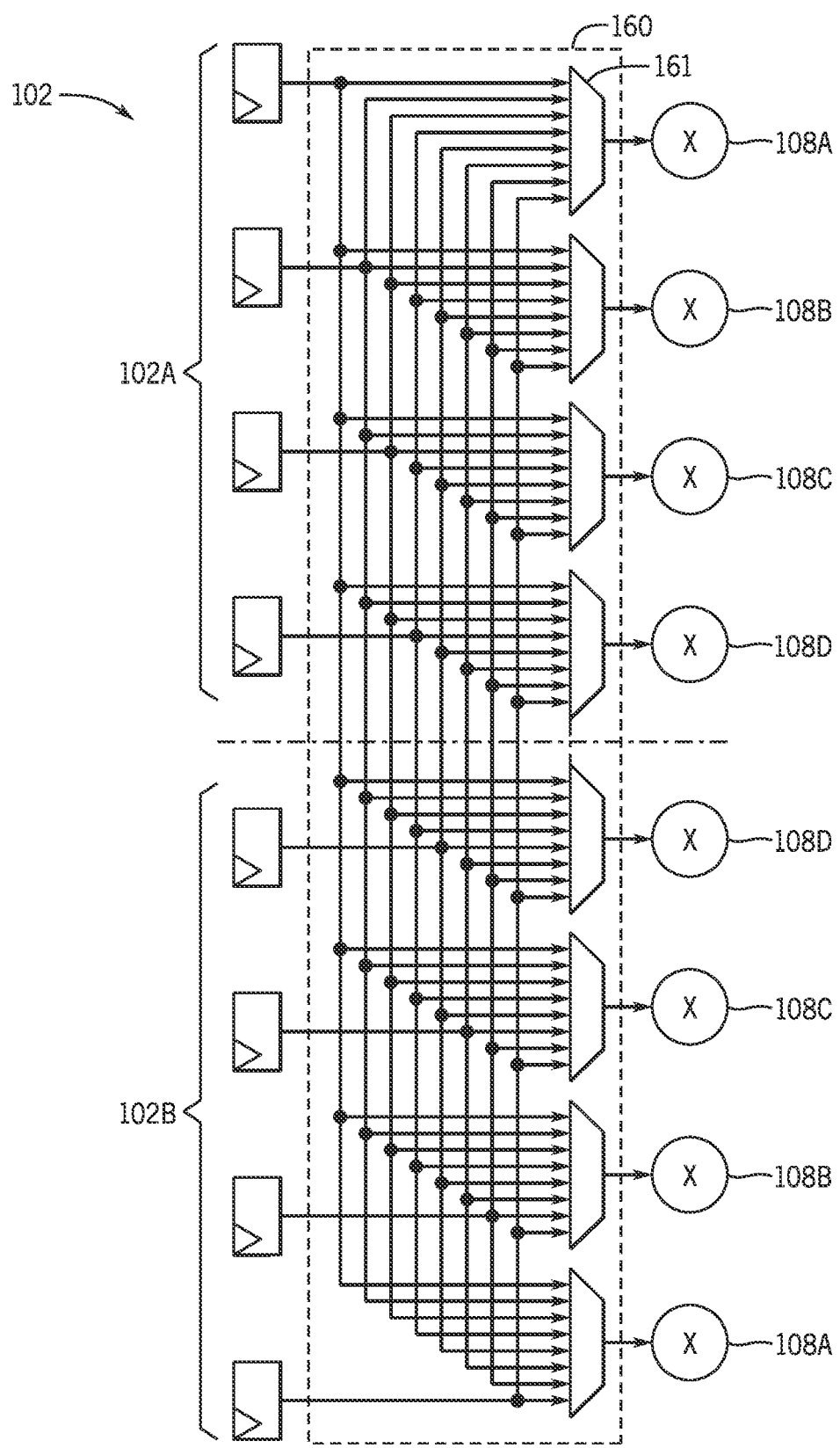
FIG. 10B is a schematic diagram of the tensor column of FIG. 10A that includes multiplexers of the multiplexer network of FIG. 10A, in accordance with an embodiment of the present disclosure.

With the foregoing in mind, FIG. 10B is a schematic diagram of a tensor column 102 with a multiplexer network structure (e.g., the multiplexer network 160) for implementing structured mixed-precision operations, in accordance with an embodiment of the present disclosure. In particular, and as illustrated in FIG. 10B, the multiplexer network 160 may include multiplexers 161 (e.g., 8:1 multiplexers) that receive values (e.g., activation values 106 and values of the header 152A, values the activation value 106 and values of the weight registers values 140, or both) and route values to be multiplied to the multipliers 108. As discussed above, each value of the registers may be streamed to each of the multiplexers 160 to enable mixed-precisions operations to be performed. Indeed, as described above, the input values may be mapped to each of the multipliers 108 in the tensor column 102, depending on the precision of the input values. For example, a first sub-column 102A of the column 102 may include multipliers 108 that are relatively higher precision multipliers that can perform multiplication operations involving higher precision values (e.g., eight-bit values), and a second sub-column 102B may include multipliers 108 that performed multiplication involved lower precision values (e.g., values with fewer than eight bits). The multiplexer network 160 may route relatively higher precision values to the multipliers 108 of the first sub-column 102 and route relatively lower precision values of the multipliers 108 of the second sub-column 102B.

While the illustrated embodiment of the multiplexer network 160 is fully connected, meaning each input may be routed to each of the multipliers 108, it should be understood that in some cases partially connected networks may be used. For example, with 50% mixed-precision operations (e.g., operations in which an equal number of high precision and low precision values are used), a multipliers 108A may have a maximum of five input values (meaning multipliers 108A may be coupled to 5:1 multiplexers 161), multipliers 108B may have a maximum of six input values (meaning multipliers 108B may be coupled to 6:1 multiplexers 161), multipliers 108C may have a maximum of seven input values (meaning multipliers 108C may be coupled to 7:1 multiplexers 161), and multipliers 108D may have eight input values (meaning multipliers 108D may be coupled to 8:1 multiplexers 161). It should be understood that any suitable partially connected network arrangement may be used.

Figure 11A:
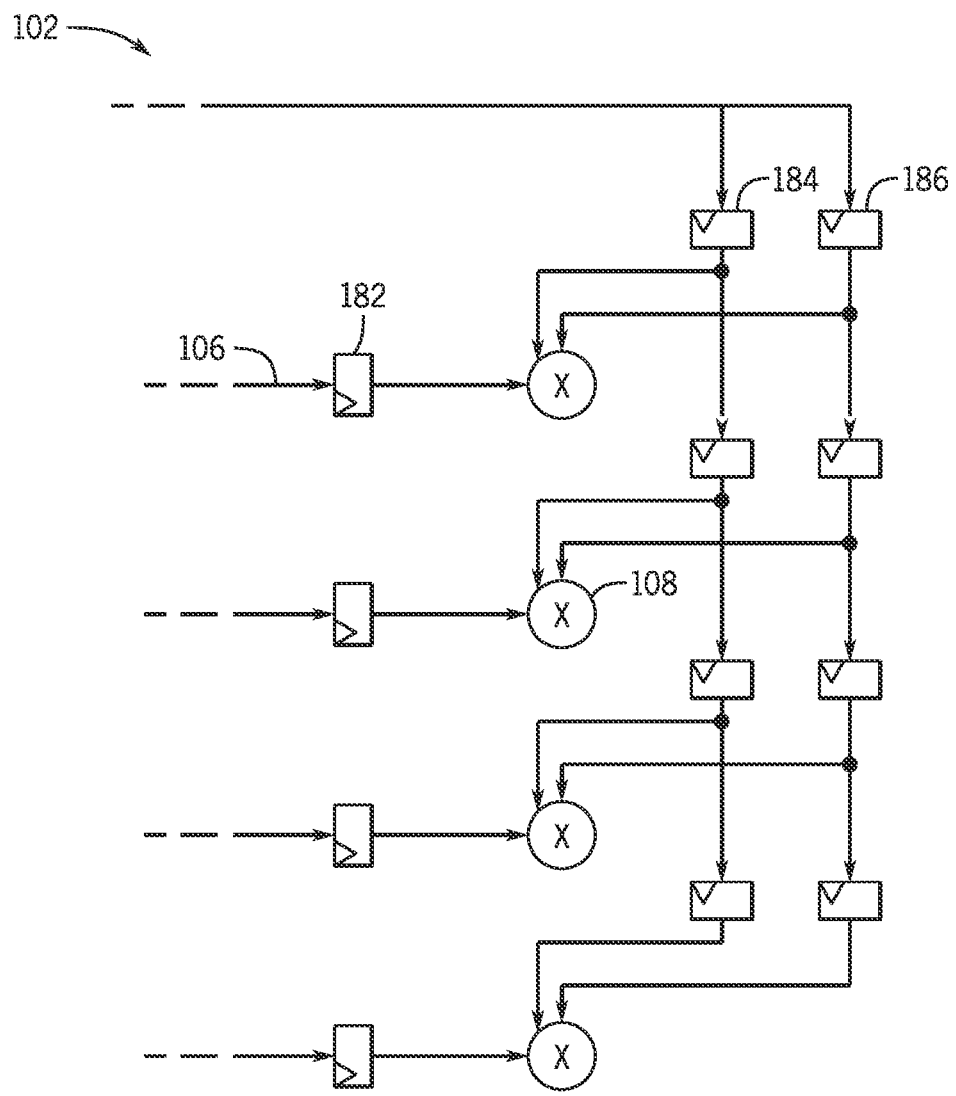
FIG. 11A is a block diagram of the tensor column of the DSP block of FIG. 1 for implementing structured mixed-precision operations, in accordance with an embodiment of the present disclosure.

Continuing with the drawings, FIG. 11A is an example of the tensor column 102 of the DSP block 26, in accordance with an embodiment of the present disclosure. The tensor column hardware may implement mixed-precision operations to reduce power output without increasing compute density. In the illustrated embodiments, the tensor column 102 may not use a multiplexer network, and rather add a signaling bit that is associated with each value weight register input value 140.

For example, activation values 106 corresponding to each of the first column registers 182 may be streamed simultaneously for each input (e.g., each row 106 of data) through the first column registers 182. The second column registers 186 may be weight registers 104 that are used to store preloaded values (e.g., values having either a relatively higher precision or a relatively lower precision). The dynamic range of each weight register input value 140 is known at input, and a signaling bit may be associated with each weight register input value 140 to signify if the preloaded values are high precision values or low precision values. The multipliers 108 may receive the values from the first column registers 182, the second column registers 186, and the control registers 184 (which contain the signaling bit). Accordingly, multiplication involving multiple precisions of values may be carried out. The outputs of the multipliers 108 may subsequently be routed to multiple compressor blocks (e.g., compression blocks 110) to compress the output of each of the multipliers 108 to vector values. The vector values may subsequently be routed to one or more adders to add the vector values to cascaded values (e.g., values provided by a preceding DSP block 26 in a column of DSP blocks).

The weight register input values 140 may be loaded into second column registers 186, and the dynamic range bit may be loaded into the control registers 184. For example, the weight register input values 140 may correspond to high precision values of 8-bit integers and low precision values of 4-bit integers. The dynamic range bit may use a value of one for signaling a low precision value and a value of zero for signaling a high precision values. For example, if the signaling bit in the control register 184 is zero to indicate low precision, the multiplier 108 may receive the zero and zero out the upper partial products of the multiplication in response to determining the input weight register values correspond to low precision values. The zeroing of the multiplication results may be completed by a booths coding circuit included in the multipliers 108. Further, multiple precisions may be supported by using multi-bit values for the signaling value input by the control registers 184. Additionally, the signaling bit value may be also be used to zero out different contiguous groups of partial products.

Figure 11B:
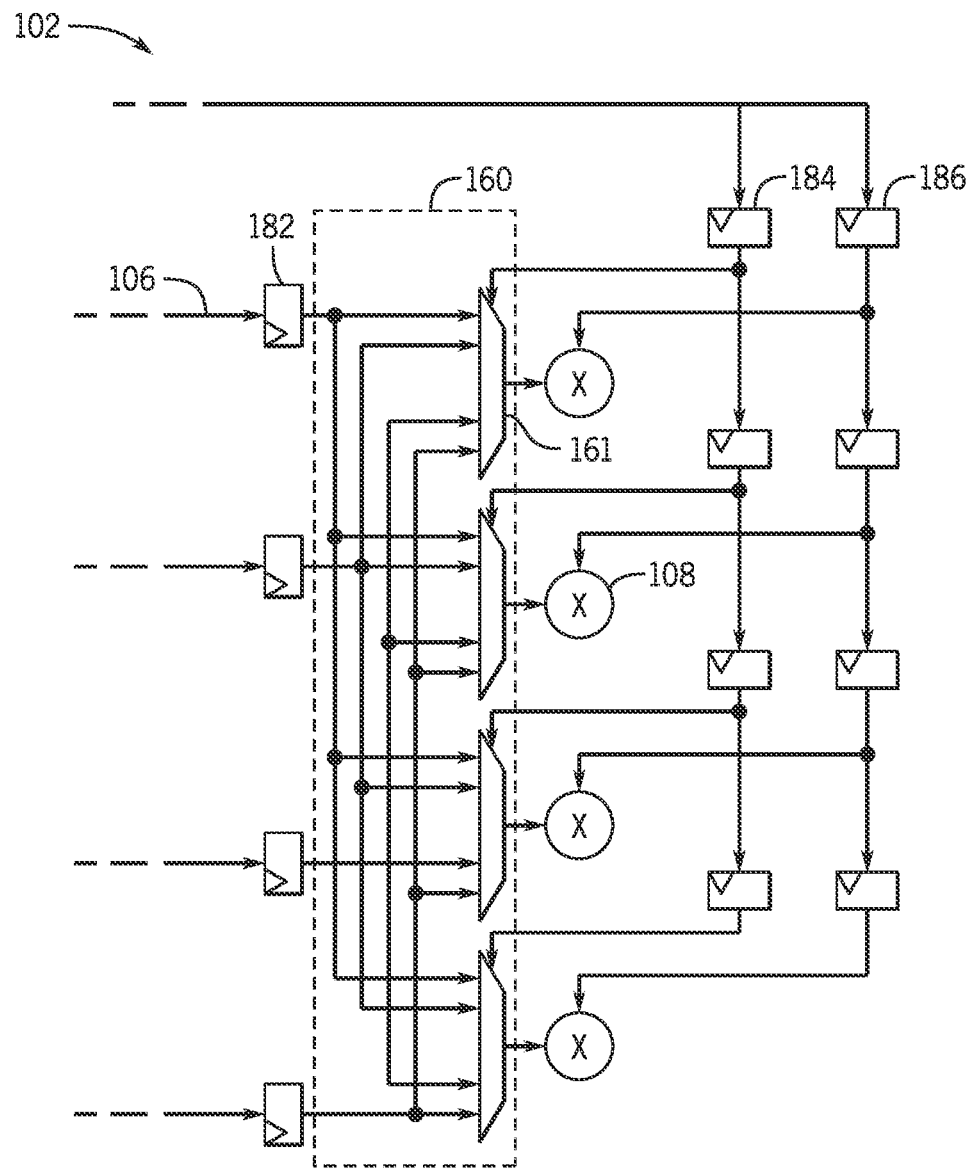
FIG. 11B is a block diagram of the tensor column of the DSP block of FIG. 1 for implementing structured mixed-precision operations, in accordance with another embodiment of the present disclosure.

FIG. 11B a tensor column 102 of the DSP block 26 that includes a multiplexer network 160 that may be utilized for mixed precision operations, in accordance with an embodiment of the present disclosure. As discussed above, the tensor column 102 may implement structured mixed-precision operations to reduce power output, while not increasing compute density. The tensor column 102 may implement the multiplexer network 160 (using multiplexers 161) to route the input activation values 106 to the multipliers 108 that corresponds to high precision values (e.g., eight-bit integer value) or low precision values (e.g., four-bit integer). This technique may be used for both zero sparsity operations and multi-precision weight value operations.

As discussed above, activation values 106 corresponding to each of the first column registers 182 may be streamed simultaneously for each input (e.g., each row 106 of data) through the first column registers 182. The multiplexers 160 of the multiplexer network may then select the first column register 182 that contains the activation values 106 corresponding to the high precision values or low precision values in the second column registers 186, which are streamed into the multiple multiplexers 160. Thus, any activation 106 may be provided to any of the multipliers 108 (e.g., high precision multipliers 162, low precision multipliers 164). For instance, the activation values 106 in each first column register 182 may be used as inputs for each of the multiplexers 160 via the routing network. The second column registers 186 may be weight registers 104 that are used to store preloaded values. The dynamic range of each weight register input value 140 is known at input, and a signaling bit may be associated with each weight register input value 140 to signify if the preloaded values are high precision values or low precision values. The multipliers 108 may multiply each of the activation values 106 selected by the multiplexers 160 by a corresponding value stored in one of the second column registers 186. The multipliers 108 may receive the values from the first column registers 182, the second column registers 186, and the control registers 184 which contain the signaling bit. The outputs of the multipliers 108 may subsequently be routed to multiple compressor blocks (e.g., compression blocks 110) to compresses the output of each of the multipliers 108 to vector values, and the vector values are then routed to one or more adders to add the vector values to cascaded values (e.g., values provided by a preceding DSP block 26 in a column of DSP blocks).

Further, each of the multiplexers 161 may receive input values from each of a control register 184 in addition to the activation value 106 input. The control registers 184 may contain information that includes multiplexer patterns for each multiplexer 160 of the multiplexer network, and specifies the high precision values and low precision values within the input values of the second column registers 186. For example, the control registers 184 may include information (e.g., a bit with a value of zero or one to respectively indicate whether a value is low precision or high precision) that corresponds to the high precision values and low precision values within the compressed values of the second column registers 186. This information may enable the multiplexers 161 to route values so that the multipliers 108 can perform structured mixed-precision operations according to the placement of the high precision values and low precision values within the input values. The multiplexer selection value for each individual weight is input in the first column registers 182 and the second column registers 186.

Before continuing with the drawings, it should be noted that each embodiment of the tensor column 102 described herein may include any suitable number of multipliers 108. In other words, the tensor column 102 may be scaled to perform mixed-precision operations involving any desired amounts of values to be multiplied.

Figure 12:
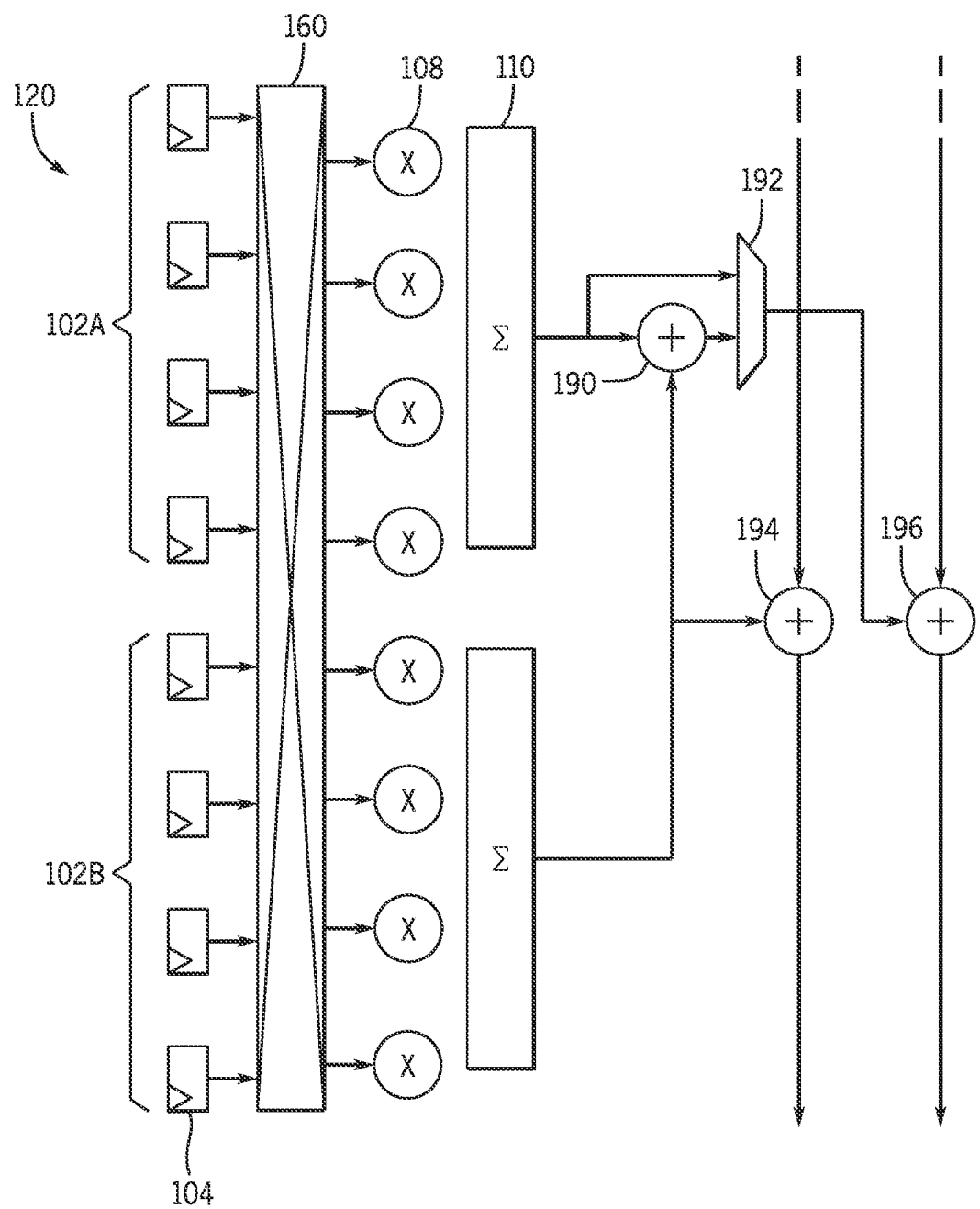
FIG. 12 is a schematic diagram of tensor column cascade construction that may be included in the DSP block of FIG. 1, in accordance with an embodiment of the present disclosure.

With the foregoing in mind, FIG. 12 is a schematic diagram of tensor column cascade construction for mixed-precision, in accordance with an embodiment of the present disclosure. The illustrated configuration may be used for 50% structured sparsity in addition to multi-precision operations within the DSP block 26. Each tensor column 102 may include two sub-columns 102A, 102B that each include four multipliers 108. The two sub-columns 102A, 102B may function as a single tensor column in a weight optimization mode and/or a non-sparsity mode. The two sub-columns 102A, 102B may also function as two individual tensor columns.

The outputs of the multipliers 108 for each of the sub-columns 102A, 102B of the tensor column 102 may be compressed by compression blocks 110 into vector product outputs. This results in two vector outputs from the multiplication operations performed by the multipliers 108 of the sub-columns 102A, 102B. The vector outputs may be added and the tensor column 102 may output compressed dot product values into a cascade multiplexing network. The cascade multiplexing network may include a first adder 190, a first multiplexer 192, adder 194, and adder 196. The first adder 190 may then add the compressed values and route the resulting value to a first multiplexer 192, which may also receive the first compressed value generated by summing the values generated by the multipliers 108 of the sub-column 102A. The output from the first multiplexer 192 may then be routed to adder 196 to be added with a value received from another DSP block 26 (e.g., cascaded from a preceding DSP block 26 in a column of DSP blocks) to produce a cascaded output value. Additionally, the value generated by summing the outputs of the multipliers 108 of the sub-column 102B may be routed to adder 194 and summed with another value received from another DSP block 26. Accordingly, each tensor column 102 may include two cascade chains that may be utilized to add values generated by the sub-columns 102A, 102B of DSP blocks 26 included in the integrated circuit device 12. Additionally, it should be noted that the adder 194 and adder 196 may be included in the adder 122 of the DSP block 26.

Figure 13:
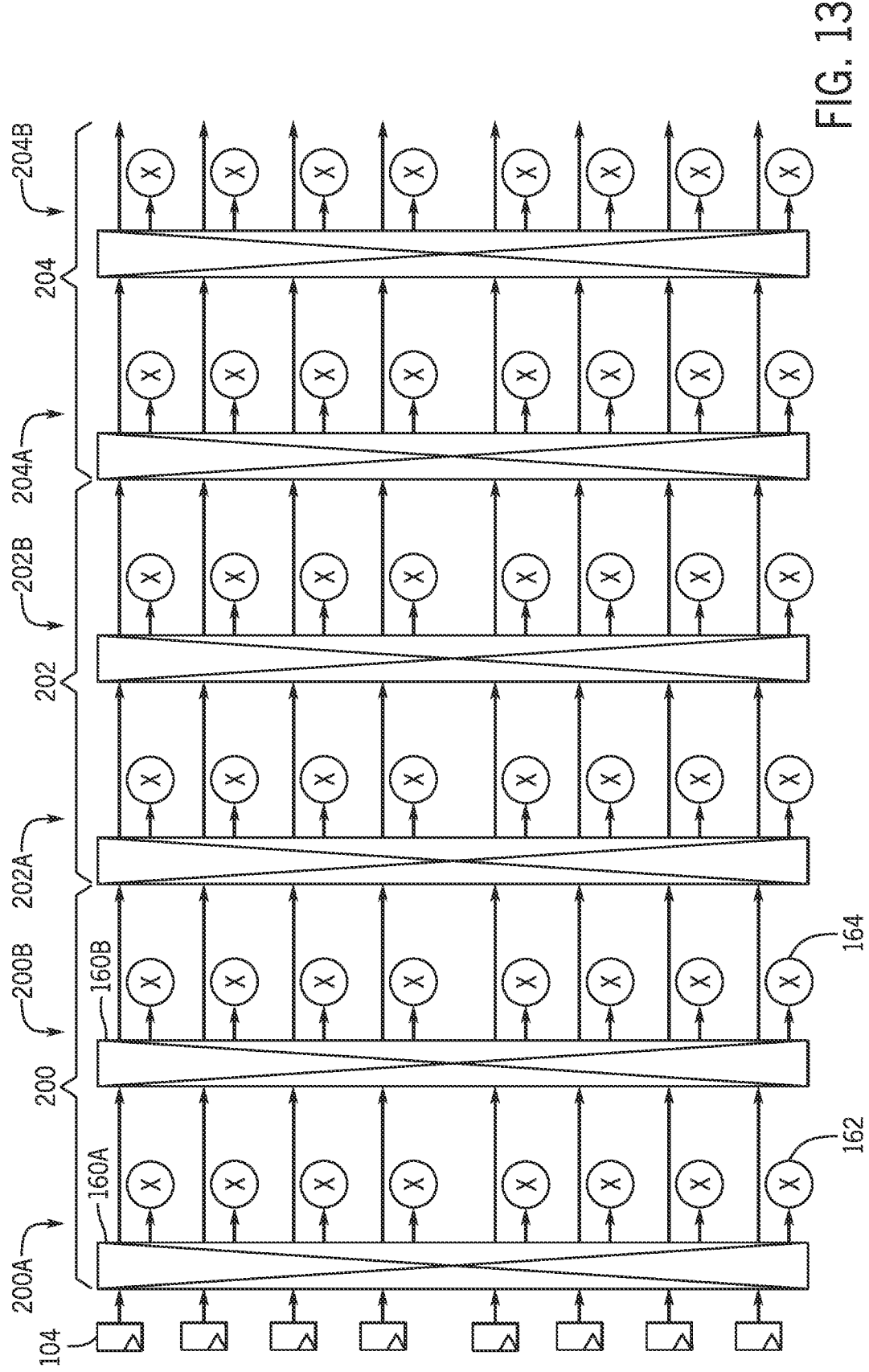
FIG. 13 is a schematic diagram of structured mixed-precision tensor column arrangement that may be included in the DSP block of FIG. 1, in accordance with an embodiment of the present disclosure.

To help provide more detail regarding the chaining of tensor columns of the DSP block 26, FIG. 13 is provided. In particular, FIG. 13 is a schematic diagram of a mixed-precision tensor column arrangement, in accordance with an embodiment of the present disclosure. Each DSP block 26 may include three columns 200, 202, 204, with column 200 (which may correspond to column 102) including sub-columns 200A, 200B, column 202 including sub-columns 202A, 202B, and column 204 including sub-columns 204A, 204B. The sub-columns 200A, 202A, 204A may include full precision multipliers 162 (e.g., eight-bit integer multipliers), and the sub-columns 200B, 202B, 204B may include and lower precision multipliers 164 (e.g., 4-bit integer multipliers). Each of the tensor columns 200, 202, 204 may include two multiplexer networks (e.g., multiplexer networks 160A, 160B respectively included in sub-columns 200A, 200B of the column 200) that route the input activation values 106 accordingly among the high precision and low precision multipliers 162, 164 (e.g., depending on the precision of weight register input value 140 as indicated by the bits of the header 152A that may be stored in registers 184).

When the DSP block 26 is operating in a regular processing mode (e.g., when performing multiplication that only involves values having the relatively higher precision), the DSP block 26 may use the full precision multipliers of the sub-columns 200A, 202A, 204A without using the sub-columns 200B, 202B, 204B. Further, the DSP block 26 may operate in 50% sparsity mode (e.g., 50% of the input weight values are zero), and use the full precision multiplier sub-columns 200A, 202A, 204A with the arrangement of FIG. 4 to route the input values based on if the value is non-zero. Alternatively (e.g., when operating only on values having the smaller precision), the DSP block 26 may route values only the lower precision multipliers 164 of the sub-columns 200B, 202B, 204B so that multiplication operations may be performed without using the multipliers of 162 of the sub-columns 200A, 202A, 204A. Accordingly, the DSP block 26 may route values to be multiplied among the multipliers 108 of only certain sub-columns (e.g., sub-columns 200A, 202A, 204A (or any combination thereof) or sub-columns 200B, 202B, 204B (or any combination thereof)) based on the weight register input values 140 (e.g., only being high precision or low precision values), the values of the control registers 184, or both. As discussed above, when the DSP block 26 is operating in structured mixed-precision mode, there are six sub-columns that each include either the high precision multipliers 162 or the low precision multipliers 164. The output of the tensor columns 200, 202, 204 are made up of the high precision multiplier 162 outputs and the low precision multiplier 164 outputs. The input activation values 106 may be streamed to the multipliers (e.g., high precision multipliers 162, low precision multipliers 164) via the first and second multiplexer networks 160A, 160B. The first and second multiplexer networks 160A, 160B may then route the input activation values 106 based on if the weight register input values 140 are high precision values or low precision values as discussed above.

Figure 14:
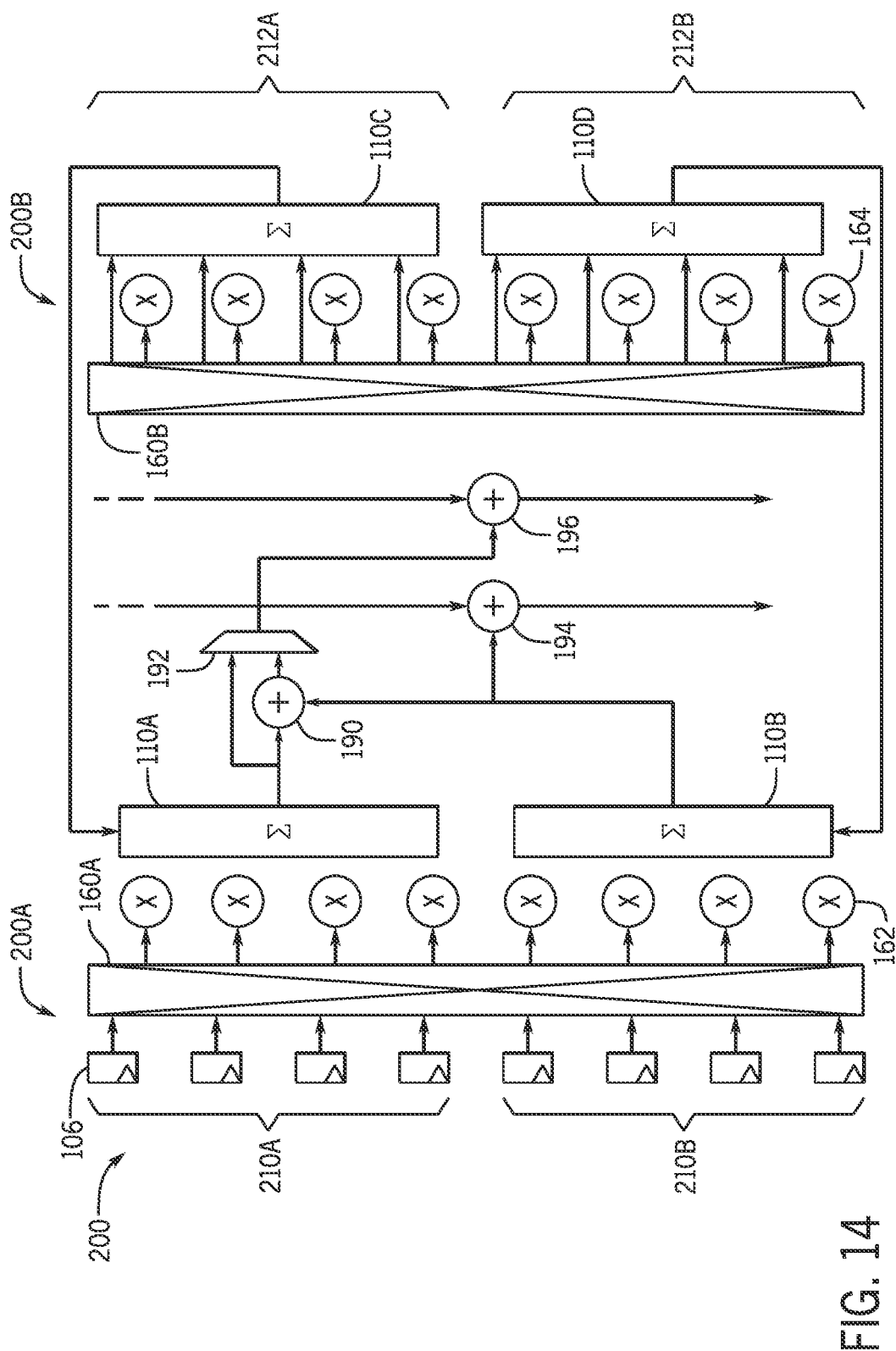
FIG. 14 is a schematic diagram of a tensor column of FIG. 13, in accordance with an embodiment of the present disclosure.

To provide more detail as to how values calculated by sub-columns may be combined, FIG. 14 is provided. More specifically, FIG. 14 is a schematic diagram of the tensor column 200 that includes the sub-columns 200A, 200B, in accordance with an embodiment of the present disclosure. As discussed above, the sub-column 200A includes high precision multipliers 162, the sub-column 200B includes low precision multipliers 164, and the multiplexer network 160 (e.g., multiplexer networks 160A, 160B) may route input activation values 106 to the multipliers 162, 164 to perform mixed-precision operations.

The sub-column 200A includes an upper portion 210A and a lower portion 210B, while the sub-column 200B includes an upper portion 212A and a lower portion 212B. The upper portion 210A, lower portion 210B, upper portion 212A, and lower portion 212B respectively include compressor circuitry 110A, 110B, 110C, 110D, each of which compresses (e.g., user adder circuitry) products generated by multipliers 108 (e.g., higher precision multipliers 162 and lower precision multipliers 164) included in the upper portion 210A, lower portion 210B, upper portion 212A, or lower portion 212B. Additionally, the compressor circuitry 110B may receive the output of the compressor circuitry 110B and generate an output equivalent to the sum of the outputs of the multipliers 62 of the lower portion 210B and the outputs of the multipliers 164 of the lower portion 212B. The adder 194 may receive output of the compressor circuitry 110B as well as a value determined by another DSP block 26 (e.g., a value cascaded by a preceding DSP block 26 in a chain of DSP blocks) and output a sum of these two values. The compressor circuitry 110A may receive the output of the compressor circuitry 110C, add the output of the compressor circuitry 110C with the outputs of the multipliers 162 of the upper portion 210A (or the sum thereof) to determine an output. Adder 190 may add the output of the compressor circuitry 110A and the compressor circuitry 110B.

The multiplexer 192 may receive the sum generated by the adder 190 and the output of the compressor circuitry 110A and selectively output either the sum generated by the adder 190 or the output of the compressor circuitry 110A. The adder 196 may receive the output of the multiplexer 192 and a value generated by another DSP block 26 (e.g., a value cascaded from another DSP block 26) and output a sum of these two values. The outputs of the adders 194, 196 may be provided to another DSP block 26, for example, to be summed with values generated by the other DSP block 26. In this way, the high precision and lower precision multiplier output values may be added together and cascaded into further DSP blocks 26.

Figure 15:
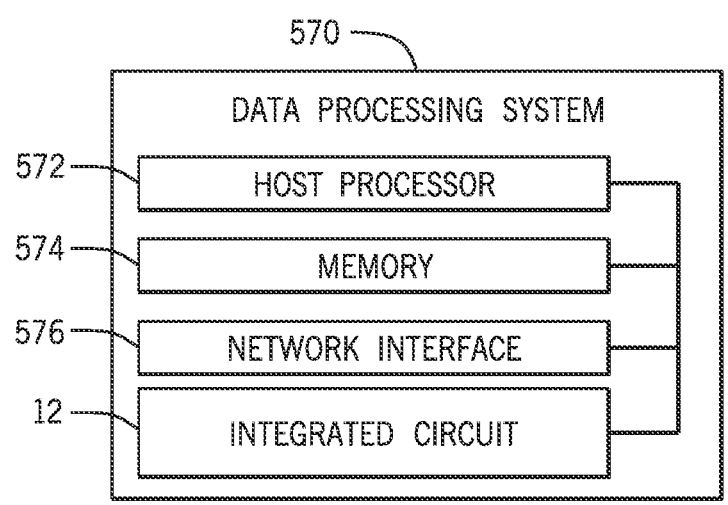
FIG. 15 is a block diagram of a data processing system, in accordance with an embodiment of the present disclosure.

In addition to the structured mixed-precision operations discussed above, the integrated circuit device 12 may be a data processing system or a component included in a data processing system. For example, the integrated circuit device 12 may be a component of a data processing system 570, shown in FIG. 15. The data processing system 570 may include a host processor 572 (e.g., a central-processing unit (CPU)), memory and/or storage circuitry 574, and a network interface 576. The data processing system 570 may include more or fewer components (e.g., electronic display, user interface structures, application specific integrated circuits (ASICs)). The host processor 572 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 570 (e.g., to perform encryption, decryption, machine learning, video processing, voice recognition, image recognition, data compression, database search ranking, bioinformatics, network security pattern identification, spatial navigation, or the like). The memory and/or storage circuitry 574 may include random access memory (RAM), read-only memory (ROM), one or more hard drives, flash memory, or the like. The memory and/or storage circuitry 574 may hold data to be processed by the data processing system 570. In some cases, the memory and/or storage circuitry 574 may also store configuration programs (bitstreams) for programming the integrated circuit device 12. The network interface 576 may allow the data processing system 570 to communicate with other electronic devices. The data processing system 570 may include several different packages or may be contained within a single package on a single package substrate. For example, components of the data processing system 570 may be located on several different packages at one location (e.g., a data center) or multiple locations. For instance, components of the data processing system 570 may be located in separate geographic locations or areas, such as cities, states, or countries.

In one example, the data processing system 570 may be part of a data center that processes a variety of different requests. For instance, the data processing system 570 may receive a data processing request via the network interface 576 to perform encryption, decryption, machine learning, video processing, voice recognition, image recognition, data compression, database search ranking, bioinformatics, network security pattern identification, spatial navigation, digital signal processing, or some other specialized task.

Furthermore, in some embodiments, the DSP block 26 and data processing system 570 may be virtualized. That is, one or more virtual machines may be used to implement a software-based representation of the DSP block 26 and data processing system 570 that emulates the functionalities of the DSP block 26 and data processing system 570 described herein. For example, a system (e.g., that includes one or more computing devices) may include a hypervisor that manages resources associated with one or more virtual machines and may allocate one or more virtual machines that emulate the DSP block 26 or data processing system 570 to perform multiplication operations and other operations described herein.

Accordingly, the techniques described herein enable particular applications to be carried out using the DSP block 26. For example, the DSP block 26 enhances the ability of integrated circuit devices, such as programmable logic devices (e.g., FPGAs), to be used for structured mixed-precision operations that may be used in machine learning and artificial intelligence applications.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS OF THE DISCLOSURE

The following numbered clauses define certain example embodiments of the present disclosure.

Clause 1
A digital signal processing (DSP) block comprising:
a plurality of weight registers configurable to receive and store a first plurality of values, wherein the first plurality of values comprises a first portion and a second portion, wherein:
the first portion comprises one or more first values of the first plurality of values having a first precision; and
the second portion comprises one or more second values of the first plurality of values having a second precision;
a plurality of multipliers, wherein each respective multiplier of the plurality of multipliers is configurable to receive a respective value of the first plurality of values, wherein the plurality of multipliers comprises:
one or more first multipliers configurable to perform multiplication involving values having the first precision; and
one or more second multipliers configurable to perform multiplication involving values having the second precision;
one or more inputs configurable to receive a second plurality of values;
a multiplexer network configurable to receive the second plurality of values and route each respective value of the second plurality of values to a multiplier of the plurality of multipliers, wherein the plurality of multipliers is configurable to simultaneously multiply each value of the first plurality of values by a respective value of the second plurality of values to generate a plurality of products; and
adder circuitry configurable to generate a first sum and a second sum based on the plurality of products.

Clause 2.
The DSP block of clause 1, comprising a plurality of control registers configurable to store a third plurality of values, wherein:
the multiplexer network is configurable to receive the third plurality of values from the plurality of control registers; and
route the second plurality of values based on the third plurality of values.

Clause 3.
The DSP block of clause 2, wherein the values of the third plurality of values are respectively indicative of whether a value of the second plurality of values is either to be multiplied by a value of the first portion of the first plurality of values or multiplied by a value of the second portion of the first plurality of values.

Clause 4.
The DSP block of clause 1, wherein:
the first precision is more precise than the second precision; and
the multiplexer network is configurable to:
route a first portion of the second plurality of values to the one or more first multipliers; and
route a second portion of the second plurality values to the one or more second multipliers;
the plurality of multipliers is configurable to generate the plurality of products by:
generating one or more first products by multiplying each of the one or more first values by a value of the first portion of the second plurality of values; and
generating one or more second products by multiplying each of the one or more second values by a value of the second portion of the second plurality of values.

Clause 5.
The DSP block of clause 4, wherein the one or more second multipliers are not configurable to perform multiplication between values having the first precision.

Clause 6.
The DSP block of clause 4, wherein the adder circuitry is configurable to:
generate the first sum by adding the one or more first products; and
generate the second sum by adding the one or more second products.

Clause 7.
The DSP block of clause 6, wherein the adder circuitry comprises:
a first adder configurable to generate a third sum by adding the first sum and the second sum;
a second adder configurable to generate a fourth sum by adding the second sum and a first value received from a second DSP block; and
a third adder configurable to generate a fifth sum by:
adding the first sum and a second value received from the second DSP block; or
adding the third sum and the second value received from the second DSP block.

Clause 8.
The DSP block of clause 1, wherein:
the first precision and the second precision are equivalent; and
the plurality of multipliers is configurable to generate the plurality of products using only the one or more first multipliers.

Clause 9.
The DSP block of clause 1, wherein:
in a first mode of operation, the multiplexer network is configurable to route the second plurality of values to the one or more first multipliers and the one or more second multipliers; and
in a second mode of operation, the multiplexer network is configurable to route the second plurality of values only to the one or more first multipliers.

Clause 10.
An integrated circuit device comprising a digital signal processing (DSP) block, the DSP block comprising:
a plurality of weight registers configurable to receive and store a first plurality of values, wherein the first plurality of values comprises a first portion and a second portion, wherein:
the first portion comprises one or more first values of the first plurality of values having a first precision; and
the second portion comprises one or more second values of the first plurality of values having a second precision;

a plurality of multipliers, wherein each respective multiplier of the plurality of multipliers is configurable to receive a respective value of the first plurality of values, wherein the plurality of multipliers comprises:
  one or more first multipliers configurable to perform multiplication involving values having the first precision; and
  one or more second multipliers configurable to perform multiplication involving values having the second precision;
one or more inputs configurable to receive a second plurality of values;
a multiplexer network configurable to receive the second plurality of values and route each respective value of the second plurality of values to a multiplier of the plurality of multipliers, wherein the plurality of multipliers is configurable to simultaneously multiply each value of the first plurality of values by a respective value of the second plurality of values to generate a plurality of products; and
adder circuitry configurable to generate a first sum and a second sum based on the plurality of products.

Clause 11.

The integrated circuit device of clause 10, comprising a plurality of control registers configurable to store a third plurality of values, wherein:
  the values of the third plurality of values are respectively indicative of whether a value of the second plurality of values is either to be multiplied by a value of the first portion of the first plurality of values or multiplied by a value of the second portion of the first plurality of values;
  the multiplexer network is configurable to receive the third plurality of values from the plurality of control registers; and
  route the second plurality of values based on the third plurality of values.

Clause 12.

The integrated circuit device of clause 11, wherein the multiplexer network comprises a plurality of multiplexers each configurable to:
  receive at least two values of the second plurality of values;
  receive a respective value of the third plurality of values; and
  route one of the at least two values of the second plurality of values to a multiplier of the plurality of multipliers based on the respective value of the third plurality of values.

Clause 13.

The integrated circuit device of clause 10, wherein the one or more first values each comprise eight bits, and the one or more second values each comprise fewer than eight bits.

Clause 14.

The integrated circuit device of clause 13, wherein the one or more second values each comprise more than one bit.

Clause 15.

The integrated circuit device of clause 10, wherein:
  the plurality of multipliers is arranged in a first column and second column; and
  the DSP block comprises a third column of multipliers and a fourth column of multipliers.

Clause 16.

The integrated circuit device of clause 10, comprising a second DSP block communicatively coupled to the DSP block and configurable to output a first output and a second output, wherein:
  the plurality of products comprises:
    one or more first products generated by multiplying a value of the one or more first values by a value of the second plurality of values; and
    one or more second products generated by multiplying a value of the one or more second values by a value of the plurality of values that is not multiplied by any of the one or more first values.
  the adder circuitry is configurable to:
    generate the first sum by adding the one or more first products; and
    generate the second sum by adding the one or more second products; and
  the adder circuitry comprises:
    a first adder configurable to generate a third sum by adding the first sum and the second sum;
    a second adder configurable to generate a fourth sum by adding the second sum and a first value received from a second DSP block; and
    a third adder configurable to generate a fifth sum by:
      adding the first sum and a second value received from the second DSP block; or
      adding the third sum and the second value received from the second DSP block.

Clause 17.

The integrated circuit device of clause 10, wherein the integrated circuit device comprises a field-programmable gate array (FPGA).

Clause 18.

A digital signal processing (DSP) block, comprising:
  a plurality of weight registers configurable to receive and store a first plurality of values, wherein the first plurality of values comprises a first portion and a second portion, wherein:
    the first portion comprises one or more first values of the first plurality of values having a first precision; and
    the second portion comprises one or more second values of the first plurality of values having a second precision;
  a plurality of multipliers, wherein each respective multiplier of the plurality of multipliers is configurable to receive a respective value of the first plurality of values, wherein the plurality of multipliers comprises:
    one or more first multipliers configurable to perform multiplication involving values having the first precision; and
    one or more second multipliers configurable to perform multiplication involving values having the second precision;
  one or more inputs configurable to receive a second plurality of values;
  a plurality of control registers configurable to store a third plurality of values, wherein values of the third plurality of values are respectively indicative of whether a value of the second plurality of values is either to be multiplied by a value of the first portion of the first plurality of values or multiplied by a value of the second portion of the first plurality of values;
  a multiplexer network configurable to:
    receive the second plurality of values and the third plurality of values; and
    route each respective value of the second plurality of values to a multiplier of the plurality of multipliers based on a corresponding value of the third plurality of values, wherein the plurality of multipliers is configurable to simultaneously multiply each value of the first plurality of values by a respective value of the second plurality of values to generate a plurality of products; and adder circuitry configurable to generate a first sum and a second sum based on the plurality of products.

Clause 19.

The DSP block of clause 18, comprising:

the DSP block is implemented on a first integrated circuit device configurable to be coupled to a substrate; and the first integrated circuit device is configurable to be communicatively coupled to a second integrated circuit device configurable to be coupled to the substrate.

Clause 20.

The DSP block of clause 19, wherein:

the first integrated circuit device comprises programmable logic; and the second integrated circuit device is a processor.

What is claimed is:

1. A digital signal processing (DSP) block comprising:
a plurality of weight registers configurable to receive and store a first plurality of values, wherein the first plurality of values comprises a first portion and a second portion, wherein:
the first portion comprises one or more first values of the first plurality of values having a first precision; and
the second portion comprises one or more second values of the first plurality of values having a second precision;
a plurality of multipliers, wherein each respective multiplier of the plurality of multipliers is configurable to receive a respective value of the first plurality of values, wherein the plurality of multipliers comprises:
one or more first multipliers configurable to perform multiplication involving values having the first precision; and
one or more second multipliers configurable to perform multiplication involving values having the second precision;
one or more inputs configurable to receive a second plurality of values;
a multiplexer network configurable to receive the second plurality of values and route each respective value of the second plurality of values to a multiplier of the plurality of multipliers, wherein the plurality of multipliers is configurable to simultaneously multiply each value of the first plurality of values by a respective value of the second plurality of values to generate a plurality of products, wherein:
in a first mode of operation, the multiplexer network is configurable to route the second plurality of values to the one or more first multipliers and the one or more second multipliers; and
in a second mode of operation, the multiplexer network is configurable to route the second plurality of values only to the one or more first multipliers; and
adder circuitry configurable to generate a first sum and a second sum based on the plurality of products.

2. The DSP block of claim 1, comprising a plurality of control registers configurable to store a third plurality of values, wherein:

the multiplexer network is configurable to receive the third plurality of values from the plurality of control registers; and route the second plurality of values based on the third plurality of values.

3. The DSP block of claim 2, wherein the values of the third plurality of values are respectively indicative of whether a value of the second plurality of values is either to be multiplied by a value of the first portion of the first plurality of values or multiplied by a value of the second portion of the first plurality of values.

4. The DSP block of claim 1, wherein:

the first precision is more precise than the second precision; and the multiplexer network is configurable to:
route a first portion of the second plurality of values to the one or more first multipliers; and
route a second portion of the second plurality values to the one or more second multipliers;

the plurality of multipliers is configurable to generate the plurality of products by:
generating one or more first products by multiplying each of the one or more first values by a value of the first portion of the second plurality of values; and
generating one or more second products by multiplying each of the one or more second values by a value of the second portion of the second plurality of values.

5. The DSP block of claim 4, wherein the one or more second multipliers are not configurable to perform multiplication between values having the first precision.

6. The DSP block of claim 4, wherein the adder circuitry is configurable to:

generate the first sum by adding the one or more first products; and generate the second sum by adding the one or more second products.

7. The DSP block of claim 6, wherein the adder circuitry comprises:

a first adder configurable to generate a third sum by adding the first sum and the second sum;

a second adder configurable to generate a fourth sum by adding the second sum and a first value received from a second DSP block; and a third adder configurable to generate a fifth sum by:
adding the first sum and a second value received from the second DSP block; or
adding the third sum and the second value received from the second DSP block.

8. The DSP block of claim 1, wherein:

the first precision and the second precision are of the same precision; and the plurality of multipliers is configurable to generate the plurality of products using only the one or more first multipliers.

9. The DSP block of claim 1, wherein the DSP block is part of a field programmable gate array (FPGA).

10. An integrated circuit device comprising:
a digital signal processing (DSP) block, the DSP block comprising:
a plurality of weight registers configurable to receive and store a first plurality of values, wherein the first plurality of values comprises a first portion and a second portion, wherein:
the first portion comprises one or more first values of the first plurality of values having a first precision; and
the second portion comprises one or more second values of the first plurality of values having a second precision;
a plurality of multipliers, wherein each respective multiplier of the plurality of multipliers is configurable to receive a respective value of the first plurality of values, wherein the plurality of multipliers comprises:
one or more first multipliers configurable to perform multiplication involving values having the first precision; and
one or more second multipliers configurable to perform multiplication involving values having the second precision;
one or more inputs configurable to receive a second plurality of values;
a multiplexer network configurable to receive the second plurality of values and route each respective value of the second plurality of values to a multiplier of the plurality of multipliers, wherein the plurality of multipliers is configurable to simultaneously multiply each value of the first plurality of values by a respective value of the second plurality of values to generate a plurality of products, wherein:
in a first mode of operation, the multiplexer network is configurable to route the second plurality of values to the one or more first multipliers and the one or more second multipliers; and
in a second mode of operation, the multiplexer network is configurable to route the second plurality of values only to the one or more first multipliers; and
adder circuitry configurable to generate a first sum and a second sum based on the plurality of products.

11. The integrated circuit device of claim 10, comprising a plurality of control registers configurable to store a third plurality of values, wherein:
the values of the third plurality of values are respectively indicative of whether a value of the second plurality of values is either to be multiplied by a value of the first portion of the first plurality of values or multiplied by a value of the second portion of the first plurality of values;
the multiplexer network is configurable to receive the third plurality of values from the plurality of control registers; and
route the second plurality of values based on the third plurality of values.

12. The integrated circuit device of claim 11, wherein the multiplexer network comprises a plurality of multiplexers each configurable to:
receive at least two values of the second plurality of values;
receive a respective value of the third plurality of values; and
route one of the at least two values of the second plurality of values to a multiplier of the plurality of multipliers based on the respective value of the third plurality of values.

13. The integrated circuit device of claim 10, wherein the one or more first values each comprise eight bits, and the one or more second values each comprise fewer than eight bits.

14. The integrated circuit device of claim 13, wherein the one or more second values each comprise more than one bit.

15. The integrated circuit device of claim 10, wherein:
the plurality of multipliers is arranged in a first column of multipliers and second column of multipliers; and
the DSP block comprises a third column of multipliers and a fourth column of multipliers.

16. The integrated circuit device of claim 10, wherein the integrated circuit device comprises a field-programmable gate array (FPGA).

17. A digital signal processing (DSP) block, comprising:
a plurality of weight registers configurable to receive and store a first plurality of values, wherein the first plurality of values comprises a first portion and a second portion, wherein:
the first portion comprises one or more first values of the first plurality of values having a first precision; and
the second portion comprises one or more second values of the first plurality of values having a second precision;
a plurality of multipliers, wherein each respective multiplier of the plurality of multipliers is configurable to receive a respective value of the first plurality of values, wherein the plurality of multipliers comprises:
one or more first multipliers configurable to perform multiplication involving values having the first precision; and
one or more second multipliers configurable to perform multiplication involving values having the second precision;
one or more inputs configurable to receive a second plurality of values;
a plurality of control registers configurable to store a third plurality of values, wherein values of the third plurality of values are respectively indicative of whether a value of the second plurality of values is either to be multiplied by a value of the first portion of the first plurality of values or multiplied by a value of the second portion of the first plurality of values;
a multiplexer network configurable to:
receive the second plurality of values and the third plurality of values; and
route each respective value of the second plurality of values to a multiplier of the plurality of multipliers based on a corresponding value of the third plurality of values, wherein the plurality of multipliers is configurable to simultaneously multiply each value of the first plurality of values by a respective value of the second plurality of values to generate a plurality of products, wherein:
in a first mode of operation, the multiplexer network is configurable to route the second plurality of values to the one or more first multipliers and the one or more second multipliers; and
in a second mode of operation, the multiplexer network is configurable to route the second plurality of values only to the one or more first multipliers; and
adder circuitry configurable to generate a first sum and a second sum based on the plurality of products.

18. The DSP block of claim 17, wherein:
the DSP block is implemented on a first integrated circuit device configurable to be coupled to a substrate; and
the first integrated circuit device is configurable to be communicatively coupled to a second integrated circuit device configurable to be coupled to the substrate.

19. The DSP block of claim 18, wherein:
the first integrated circuit device comprises programmable logic; and
the second integrated circuit device is a processor.

20. The DSP block of claim 17, wherein the DSP block is part of a field programmable gate array (FPGA).

* * * * *